US012351377B2

(12) United States Patent
Boswell et al.

(10) Patent No.: US 12,351,377 B2
(45) Date of Patent: Jul. 8, 2025

(54) BIODEGRADABLE PAPER BARRIER LAMINATE

(71) Applicant: The Procter & Gamble Company, Cincinnati, OH (US)

(72) Inventors: Emily Charlotte Boswell, Cincinnati, OH (US); Pier-Lorenzo Caruso, Frankfurt am Main (DE); Uwe Bolz, Tutzing (DE)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 17/386,590

(22) Filed: Jul. 28, 2021

(65) Prior Publication Data

US 2022/0033158 A1    Feb. 3, 2022

Related U.S. Application Data

(60) Provisional application No. 63/058,653, filed on Jul. 30, 2020.

(51) Int. Cl.
| | |
|---|---|
| *B65D 65/42* | (2006.01) |
| *B65D 65/46* | (2006.01) |
| *D21H 19/12* | (2006.01) |
| *D21H 19/82* | (2006.01) |
| *B05D 7/00* | (2006.01) |

(52) U.S. Cl.
CPC ......... *B65D 65/466* (2013.01); *B65D 65/42* (2013.01); *D21H 19/12* (2013.01); *D21H 19/82* (2013.01); *B05D 7/584* (2013.01); *B05D 2203/22* (2013.01); *B05D 2401/20* (2013.01)

(58) Field of Classification Search
CPC ...... B65D 65/38; B65D 65/46; B65D 65/466; B32B 19/045; B32B 19/046; B32B 27/10; B32B 2264/1027; B32B 2264/201; B32B 2264/308; B32B 2307/7163; B32B 27/36; B32B 2307/7246; C08L 29/02; C08L 29/04; C08K 3/346; D21H 19/40
USPC ............................. 428/34.1–34.3; 206/524.7
See application file for complete search history.

(56) References Cited

U.S. PATENT DOCUMENTS

| | | | | |
|---|---|---|---|---|
| 3,804,785 | A | * 4/1974 | Hirao et al. | ........... D21H 17/36 524/53 |
| 4,152,387 | A | 5/1979 | Cloeren | |
| 4,197,069 | A | 4/1980 | Cloeren | |
| 4,521,437 | A | 6/1985 | Storms | |
| 4,765,916 | A | * 8/1988 | Ogar, Jr. | ............... C11D 17/041 510/513 |

(Continued)

FOREIGN PATENT DOCUMENTS

| | | |
|---|---|---|
| CN | 1736812 A | 2/2006 |
| CN | 103343483 A | 10/2013 |

(Continued)

OTHER PUBLICATIONS

All Office Actions: U.S. Appl. No. 17/495,832, filed Oct. 7, 2021.

(Continued)

*Primary Examiner* — Michael C Romanowski
(74) *Attorney, Agent, or Firm* — Kathleen Y. Carter

(57) ABSTRACT

A biodegradable paper laminate comprising a water-dispersible barrier against permeation.

45 Claims, 3 Drawing Sheets

(56) References Cited

U.S. PATENT DOCUMENTS

| | | | |
|---|---|---|---|
| 4,846,992 A * | 7/1989 | Fonsny | C11D 17/043 |
| | | | 510/504 |
| 5,391,423 A | 2/1995 | Wnuk et al. | |
| 5,498,692 A | 3/1996 | Noda | |
| 5,939,467 A | 8/1999 | Wnuk et al. | |
| 6,293,402 B1 | 9/2001 | Rogers et al. | |
| 6,358,576 B1 * | 3/2002 | Adur | B32B 27/10 |
| | | | 428/34.3 |
| 6,426,135 B1 | 7/2002 | Kotani | |
| 6,444,751 B1 | 9/2002 | Chujo | |
| 6,509,072 B2 | 1/2003 | Bening et al. | |
| 6,966,166 B2 | 11/2005 | Kissling | |
| 8,007,895 B2 | 8/2011 | Ebina et al. | |
| 8,129,042 B2 | 3/2012 | Oosaki et al. | |
| 8,637,126 B2 | 1/2014 | Cleveland | |
| 9,732,235 B2 * | 8/2017 | Iroh | C08G 18/3243 |
| 10,882,676 B2 | 1/2021 | Okamoto | |
| 11,059,015 B2 * | 7/2021 | Shukla | C01B 32/158 |
| 11,062,817 B1 * | 7/2021 | Tabor | C23C 26/00 |
| 11,192,139 B2 | 12/2021 | Boswell | |
| 11,326,303 B2 * | 5/2022 | Netravali | D06M 11/79 |
| 11,473,190 B2 | 10/2022 | Boswell et al. | |
| 11,738,367 B2 | 8/2023 | Boswell | |
| 12,116,184 B2 | 10/2024 | Hoefte | |
| 2001/0054567 A1 | 12/2001 | Desmarais et al. | |
| 2002/0055579 A1 | 5/2002 | Oshita | |
| 2002/0127358 A1 * | 9/2002 | Berlin | B32B 27/065 |
| | | | 156/324 |
| 2002/0160159 A1 * | 10/2002 | McDonald | D06M 11/44 |
| | | | 428/402 |
| 2002/0161088 A1 | 10/2002 | Kochvar | |
| 2003/0232211 A1 | 12/2003 | Kendall | |
| 2004/0053037 A1 | 3/2004 | Koch | |
| 2004/0126514 A1 * | 7/2004 | McGee | G09F 3/10 |
| | | | 428/34.1 |
| 2006/0088707 A1 * | 4/2006 | Oosaki | B32B 27/08 |
| | | | 428/411.1 |
| 2006/0222797 A1 * | 10/2006 | Bekele | B32B 27/306 |
| | | | 428/35.7 |
| 2006/0258553 A1 * | 11/2006 | Catalfamo | C11D 3/3907 |
| | | | 510/302 |
| 2007/0106005 A1 * | 5/2007 | Bourgeois | C01B 33/44 |
| | | | 524/445 |
| 2007/0178299 A1 * | 8/2007 | Verrall | C08J 5/18 |
| | | | 428/323 |
| 2007/0191527 A1 | 8/2007 | Mallikarjuna | |
| 2008/0009585 A1 * | 1/2008 | Catalfamo | B65D 65/46 |
| | | | 525/57 |
| 2008/0038560 A1 | 2/2008 | Knoerzer et al. | |
| 2008/0108748 A1 | 5/2008 | Buckley | |
| 2008/0182937 A1 | 7/2008 | Urian et al. | |
| 2008/0268446 A1 | 10/2008 | Steichen | |
| 2009/0098395 A1 | 4/2009 | Lu | |
| 2009/0286090 A1 | 11/2009 | Ting et al. | |
| 2011/0135912 A1 * | 6/2011 | Xu | B32B 27/10 |
| | | | 428/331 |
| 2011/0211778 A1 * | 9/2011 | Zerfas | B32B 27/10 |
| | | | 493/213 |
| 2011/0293957 A1 * | 12/2011 | Johansson | D21H 19/44 |
| | | | 428/533 |
| 2011/0311794 A1 * | 12/2011 | Zhou | B32B 27/20 |
| | | | 428/216 |
| 2012/0100320 A1 | 4/2012 | Toft | |
| 2012/0117921 A1 * | 5/2012 | Toft | B29C 66/72341 |
| | | | 427/404 |
| 2012/0216718 A1 * | 8/2012 | Berglund | C08K 5/0025 |
| | | | 977/773 |
| 2012/0288693 A1 * | 11/2012 | Stanley | B32B 27/34 |
| | | | 428/220 |
| 2014/0099455 A1 * | 4/2014 | Stanley | B32B 27/36 |
| | | | 428/34.3 |
| 2014/0329039 A1 | 11/2014 | Neuman et al. | |
| 2014/0349047 A1 * | 11/2014 | McCaffrey | B32B 23/08 |
| | | | 428/216 |
| 2014/0376835 A1 * | 12/2014 | Rogers | B32B 27/065 |
| | | | 383/105 |
| 2015/0314941 A1 | 11/2015 | Ramadas | |
| 2015/0376450 A1 * | 12/2015 | Beyer | C08J 7/043 |
| | | | 264/129 |
| 2016/0230343 A1 * | 8/2016 | Pang | D21H 19/44 |
| 2017/0021995 A1 * | 1/2017 | Corbett | B65D 41/04 |
| 2017/0022658 A1 | 1/2017 | Fang | |
| 2018/0369859 A1 | 12/2018 | Boswell et al. | |
| 2020/0079922 A1 * | 3/2020 | Fuchs | C08J 5/18 |
| 2020/0269554 A1 * | 8/2020 | Noda | D21H 19/822 |
| 2020/0317413 A1 * | 10/2020 | Fortin | D21H 19/828 |
| 2021/0146591 A1 * | 5/2021 | Woo | B29C 48/9135 |
| 2021/0245481 A1 * | 8/2021 | Nyflött | D21H 19/22 |
| 2022/0055065 A1 | 2/2022 | Boswell et al. | |
| 2023/0087382 A1 * | 3/2023 | Vishtal | D21H 11/14 |
| 2023/0234096 A1 | 7/2023 | Caruso et al. | |

FOREIGN PATENT DOCUMENTS

| | | |
|---|---|---|
| CN | 108556426 A | 9/2018 |
| EP | 0457600 B1 | 9/1996 |
| JP | 2005011783 A | 1/2005 |
| JP | 2020066216 A | 4/2020 |
| KR | 20170111097 A | 10/2017 |
| WO | 9426513 A1 | 11/1994 |
| WO | 9605054 A1 | 2/1996 |
| WO | 9809812 A1 | 3/1998 |
| WO | 2007027027 A1 | 3/2007 |
| WO | 2007027224 A2 | 3/2007 |
| WO | 2008053379 A2 | 5/2008 |
| WO | 2009032868 A1 | 3/2009 |
| WO | 2014071377 A1 | 5/2014 |
| WO | 2017072124 A1 | 5/2017 |
| WO | 2018031388 A1 | 2/2018 |
| WO | 2018108687 A1 | 6/2018 |
| WO | 2019229759 A1 | 12/2019 |

OTHER PUBLICATIONS

All Office Actions; U.S. Appl. No. 17/495,836, filed Oct. 7, 2021.
Unpublished U.S. Appl. No. 17/495,832, filed Oct. 7, 2021, to Emily Charlotte Boswell et. al.
Unpublished U.S. Appl. No. 17/495,836, filed Oct. 7, 2021, to Emily Charlotte Boswell et. al.
All Office Actions; U.S. Appl. No. 17/182,265, filed Feb. 23, 2021.
All Office Actions; U.S. Appl. No. 17/386,584, filed Jul. 28, 2021.
All Office Actions, U.S. Appl. No. 17/386,586, filed Jul. 28, 2021.
Unpublished U.S. Appl. No. 17/182,265, filed Feb. 23, 2021, to Martin Ian James et. al.
Unpublished U.S. Appl. No. 17/386,584, filed Jul. 28, 15, 2021, to Pier-Lorenzo Caruso et. al.
Unpublished U.S. Appl. No. 17/386,586, filed Jul. 28, 2021, to Emily Charlotte Boswell et. al.
PCT Search Report and Written Opinion for PCT/US2021/071025 dated Oct. 21, 2021, 9 pages.
All Office Actions; U.S. Appl. No. 18/419,676, filed Jan. 23, 2024.
Unpublished U.S. Appl. No. 18/419,676, filed Jan. 23, 2024, Emily Charlotte Boswell et al.

* cited by examiner

BIODEGRADABLE PAPER BARRIER LAMINATE

FIELD OF THE INVENTION

The present invention relates to a biodegradable paper barrier laminate for flexible package applications or product delivery systems such as sachets, pouches, bags, comprising a biodegradable paper combined with a biodegradable lamination layer, a water-dispersible barrier layer and a biodegradable sealing layer offering several advantages compared to prior-art paper based flexible packages; and a method for producing biodegradable paper barrier laminates.

BACKGROUND OF THE INVENTION

Paper based packaging is becoming more popular amongst consumers because it is regarded as more natural, more biodegradable, and more recyclable. However, the barrier properties of uncoated paper are poor and attempts to improve the barrier properties by adding a coating often lead to reduction in the ability of the paper to biodegrade in various environments and also reduce the ability of the package to be recyclable in commercial paper recycling systems.

Uncoated paper-based packaging is typically highly biodegradable in certain environments and is very easily recyclable in commercial paper recycling systems. However, a paper with no coating or adhesive at all cannot easily be formed into a complete functional package. Also, uncoated paper-based packaging can only be used to contain dry products that do not require any type of water/moisture or gas or perfume or grease barrier. If the dry product is sensitive to moisture, it will be damaged by moisture entering the package very quickly. If it is sensitive to oxygen, it will oxidize. If the product is greasy then grease will migrate through the paper and leave unsightly stains on the outside of the package. If the product contains perfume, then perfume will escape out of the package and change the nature of the intended odor of the product. However, if a coating is added to the paper to improve the barrier properties and/or to make it sealable, in the event of improper disposal, it is desirable that the coating is not affecting the ability of the entire package to biodegrade across a range of the most expected environmental conditions. Failure to degrade may have adverse environmental effects such as persistent microplastics in seawater. In addition, one must be very careful to avoid negatively affecting the ability of the package to be recyclable in commercial paper recycling systems.

A common way to solve the poor barrier properties of paper and make it sealable is to add a polyethylene-based, or ethylene copolymer based or other non-biodegradable polymeric coating to the surface of the paper, either by coating, printing or lamination. However, if this polyethylene coating is too thick, it will negatively affect the recyclability of the paper laminate in typical commercial paper recycling systems. There are many examples where polyethylene coatings have caused issues in the paper recycling processes, especially where thicker coatings were used to increase seal strength and/or increase barrier properties. Examples of such issues are, but are not limited to: i) coatings that clog the filters in repulping tanks and systems; ii) coatings that hold tightly onto the paper fibers and prevent a high % of the paper fibers being released into the water of the repulping system; iii) coatings that end up being incorporated into the recycled paper and negatively affect the appearance or performance properties of the resulting recycled paper.

If such a polyethylene coating is made very thin, the overall structure might be considered recyclable in the paper recycling stream if it can be stripped off and sent to a landfill or burned to fuel the plant, leaving the paper fibers to be collected and recycled into paper. However, such a structure still has several disadvantages because if it is improperly disposed of in the environment, the paper would biodegrade, but not the polyethylene coating. This will instead form persistent microplastics negatively impacting the environment, appearing as a non-nutritive food source for some animals. Furthermore, many consumers notice the appearance of the shiny polyethylene layer on the inner surface of the paper laminate and react negatively to it. A polyethylene coating would also adversely affect the ability of the package to be composted, either via industrial or home composting, unless the polyethylene coating could easily be removed by a consumer prior to composting.

If conversely biodegradable materials are used instead of polyethylene, it is well known that the barrier properties of biodegradable materials are poor against moisture. Such a biodegradable coating would necessarily be very thick, causing issues in the paper recycling process.

There is therefore an unmet need for paper laminates for flexible packaging applications, provided with moisture barrier and sealant layer, with reduced environmental impact in environments such as soil and aquatic environments and in composting situations, and which also enable increased recycling efficiency in industrial paper repulping systems.

SUMMARY OF THE INVENTION

A biodegradable paper barrier laminate is provided, which in embodiments is compatible with home or industrial composting facilities, that is biodegradable if improperly disposed in the environment and is recyclable in industrial paper recycling facilities. The laminate is made from a biodegradable paper layer having an outer surface and an inner surface; a first biodegradable polymeric layer having an outer surface and an inner surface, said outer surface disposed on said inner surface of said paper layer; a water-dispersible barrier layer having an outer surface and an inner surface, said outer surface disposed on said inner surface of said biodegradable polymeric layer; a second biodegradable polymeric layer having an outer surface and an inner surface, said outer surface disposed on said inner surface of said water-dispersible barrier layer.

A biodegradable paper barrier laminate is provided, which in embodiments is compatible with home or industrial composting facilities, that is biodegradable if improperly disposed in the environment and is recyclable in industrial paper recycling facilities. The laminate is made from a biodegradable paper layer having an outer surface and an inner surface; a first biodegradable polymeric layer having an outer surface and an inner surface, said outer surface disposed on said inner surface of said paper layer; a water-dispersible barrier layer having an outer surface and an inner surface, said outer surface disposed on said inner surface of said biodegradable polymeric layer; a biodegradable adhesive layer having an outer surface and an inner surface, said outer surface disposed on said inner surface of said water-dispersible barrier; a second biodegradable polymeric layer having an outer surface and an inner surface, said outer surface disposed on said inner surface of said water-dispersible barrier layer.

A method of making a biodegradable paper barrier laminate comprising the following steps: applying a first aqueous system of a water-borne biodegradable polymeric composition onto the surface of a removeable flat carrier, such as a PET film or a steel belt; removing the water from the first aqueous system of a water-borne biodegradable polymeric composition to obtain a first biodegradable polymeric layer; applying an aqueous dispersion of hydrophilic nanoplatelets onto the outer surface of the first biodegradable polymeric layer; removing the water from the aqueous dispersion of hydrophilic nanoplatelets to obtain a water-dispersible barrier layer; applying a second aqueous system of a water-borne biodegradable polymeric composition onto the surface of the biodegradable paper layer, said paper layer is preferably machine glazed and/or sized or is a vellum or glassine paper to avoid hygro-expansion; combining the outer surface of the water-dispersible barrier layer against the second aqueous system of a water-borne biodegradable polymeric composition; removing the water from the second aqueous solution of a water-borne biodegradable polymeric composition to obtain a second biodegradable polymeric layer; removing the flat carrier from the resulting biodegradable paper barrier laminate. For cases where the water-borne biodegradable polymeric composition is water insoluble, an additional step can be taken to heat the biodegradable polymeric composition in order to melt it and to allow it to form a continuous biodegradable polymeric layer—this heating step is not needed if the biodegradable polymeric composition is water-soluble.

A method of making a biodegradable paper barrier laminate comprising the following steps: applying a first aqueous system of a water-borne biodegradable polymeric composition onto the surface of a removeable flat carrier, such as PET films or steel belts; removing the water from the first aqueous system of a water-borne biodegradable polymeric composition to obtain a first biodegradable polymeric layer; applying heat to the first biodegradable polymeric layer to form a continuous first biodegradable polymeric layer; applying an aqueous dispersion of hydrophilic nanoplatelets onto the outer surface of the first biodegradable polymeric layer; removing the water from the aqueous dispersion of hydrophilic nanoplatelets to obtain a water-dispersible barrier layer; applying a second aqueous system of a water-borne polymeric composition onto the inner surface of a biodegradable paper layer; combining the outer surface of the water-dispersible barrier layer onto the second aqueous system of a water-borne polymeric composition; removing the water from the second aqueous system of a water-borne biodegradable polymeric composition to obtain a second biodegradable polymeric layer; removing the flat carrier from the resulting recyclable paper barrier laminate.

A method of making a biodegradable paper barrier laminate comprising the following steps: applying a first aqueous system of a water-borne biodegradable polymeric composition onto the inner surface of a biodegradable paper layer, paper layer preferably machine glazed and/or sized or is a vellum or glassine paper to avoid hygro-expansion; removing the water from the first aqueous system of a water-borne biodegradable polymeric composition to obtain a first biodegradable polymeric layer; applying an aqueous dispersion of hydrophilic nanoplatelets onto the inner surface of the first biodegradable polymeric layer; removing the water from the aqueous dispersion of hydrophilic nanoplatelets to obtain a water-dispersible barrier layer; applying a second aqueous system of a water-borne biodegradable polymeric composition onto the inner surface of the water dispersible barrier layer; removing the water from the second aqueous system of the water-borne biodegradable polymeric composition to obtain a second biodegradable polymeric layer. For cases where the water-borne biodegradable polymeric composition is water insoluble, an additional step can be taken to heat the biodegradable polymeric composition in order to melt it and to allow it to form a continuous biodegradable polymeric layer—this heating step is not needed if the biodegradable polymeric composition is water-soluble.

A method of making a biodegradable paper barrier laminate comprising the following steps: applying a first aqueous system of a water-borne biodegradable polymeric composition onto the inner surface of the biodegradable paper layer, said paper layer is preferably machine glazed and/or sized or is a vellum or glassine paper to avoid hygro-expansion; removing the water from the first aqueous system of a water-borne biodegradable polymeric composition to obtain a first biodegradable polymeric layer; for cases where the water-borne biodegradable polymeric composition is water insoluble, an additional step can be taken to heat the biodegradable polymeric composition in order to melt it and to allow it to form a continuous biodegradable polymeric layer—this heating step is not needed if the biodegradable polymeric composition is water-soluble; applying an aqueous dispersion of hydrophilic nanoplatelets onto the inner surface of the first biodegradable polymeric layer; removing the water from the aqueous dispersion of hydrophilic nanoplatelets to obtain a water-dispersible barrier layer; melting a second biodegradable polymeric composition within an extruder; thermally extruding the molten second biodegradable polymeric composition onto the surface of the water-dispersible barrier layer; cooling the second biodegradable polymeric composition to form the second biodegradable polymeric layer.

A method of making a biodegradable paper barrier laminate comprising the following steps: applying a first aqueous system of a water-borne biodegradable polymeric composition onto the inner surface of the biodegradable paper layer, said paper layer is preferably machine glazed and/or sized or is a vellum or glassine paper to avoid hygro-expansion; removing the water from the first aqueous system of the water-borne biodegradable polymeric composition to obtain a first biodegradable polymeric layer; for cases where the water-borne biodegradable polymeric composition is water insoluble, an additional step can be taken to heat the biodegradable polymeric composition in order to melt it and to allow it to form a continuous biodegradable polymeric layer—this heating step is not needed if the biodegradable polymeric composition is water-soluble; applying an aqueous dispersion of hydrophilic nanoplatelets onto the inner surface of the first biodegradable polymeric layer; removing the water from the aqueous dispersion of hydrophilic nanoplatelets to obtain a water-dispersible barrier layer; applying a biodegradable adhesive to the inner surface of the water-dispersible barrier layer; separately obtaining a film made from a biodegradable polymeric composition that can be made by a variety of methods including solution casing, thermal cast film extrusion and thermal blown film extrusion; applying said film made from a biodegradable polymeric composition onto the surface of the biodegradable adhesive.

DETAILED DESCRIPTION OF THE INVENTION

Figure 1:
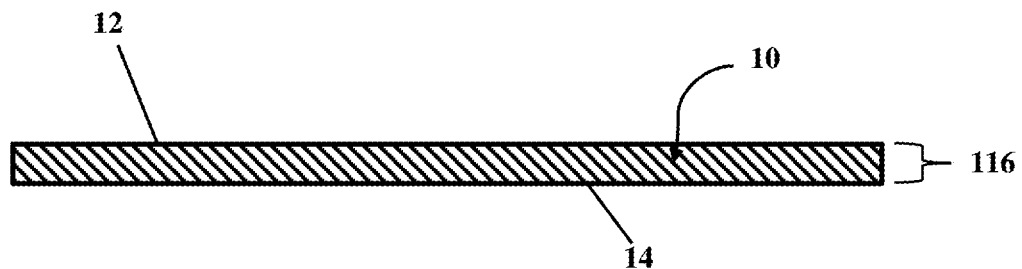
FIG. 1 shows a cross-section of a biodegradable paper layer 10.

The invention describes a biodegradable paper barrier laminate offering several advantages compared to prior art paper barrier laminates, and several methods for making biodegradable paper barrier laminates.

As used herein, the term "water vapor transmission rate" or "WVTR" refers to the rate at which water vapor is transmitted through a film, when measured according to the Water Vapor Transmission Test Method set forth in the Test Methods section.

As used herein, the term "dissolution time" refers to the time required for a water-soluble film (such as a film made of a polymeric vinyl alcohol) to be dissolved, when measured according to the Dissolution Test Method set forth in the Test Methods section.

As used herein, the term "water-dispersible" means breaking apart in water in small fragments smaller than a millimeter. These fragments can, but do not need to be stably suspended in water.

As used herein, the term "copolymer" means a polymer formed from two, or more, types of monomeric repeating units. The term "copolymer" as used herein further encompasses terpolymers, such as terpolymers having a distribution of vinyl alcohol monomer units, vinyl acetate monomer units, and possibly butene diol monomer units; however, if the copolymer is substantially fully hydrolyzed, substantially no vinyl acetate monomeric units may be present.

As used herein, the term "degree of hydrolysis" refers to the mole percentage of vinyl acetate units that are converted to vinyl alcohol units when a polymeric vinyl alcohol is hydrolyzed.

As used herein, when the term "about" modifies a particular value, the term refers to a range equal to the particular value, plus or minus twenty percent (+/−20%). For any of the embodiments disclosed herein, any disclosure of a particular value, can, in various alternate embodiments, also be understood as a disclosure of a range equal to about that particular value (i.e. +/−20%).

As used herein, when the term "approximately" modifies a particular value, the term refers to a range equal to the particular value, plus or minus fifteen percent (±15%). For any of the embodiments disclosed herein, any disclosure of a particular value, can, in various alternate embodiments, also be understood as a disclosure of a range equal to approximately that particular value (i.e. ±15%).

As used herein, when the term "substantially" modifies a particular value, the term refers to a range equal to the particular value, plus or minus ten percent (±10%). For any of the embodiments disclosed herein, any disclosure of a particular value, can, in various alternate embodiments, also be understood as a disclosure of a range equal to approximately that particular value (i.e. ±10%).

As used herein, when the term "nearly" modifies a particular value, the term refers to a range equal to the particular value, plus or minus five percent (±5%). For any of the embodiments disclosed herein, any disclosure of a particular value, can, in various alternate embodiments, also be understood as a disclosure of a range equal to approximately that particular value (i.e. +5%).

FIG. 1 shows a cross-section of a biodegradable paper layer 10. The biodegradable paper layer 10 has a first surface 12 and a second surface 14 opposite to the first surface 12, a thickness 116 between the surfaces 12 and 14, and a grammage obtained from the thickness 116 and the paper density.

The grammage of the biodegradable paper layer 10 can range from about 20 $g/m^2$ to about 200 $g/m^2$, preferably from about 40 $g/m^2$ to about 120 $g/m^2$, more preferably from about 50 $g/m^2$ to about 100 $g/m^2$ and more preferably from about 60 $g/m^2$ to 85 $g/m^2$.

Figure 2:
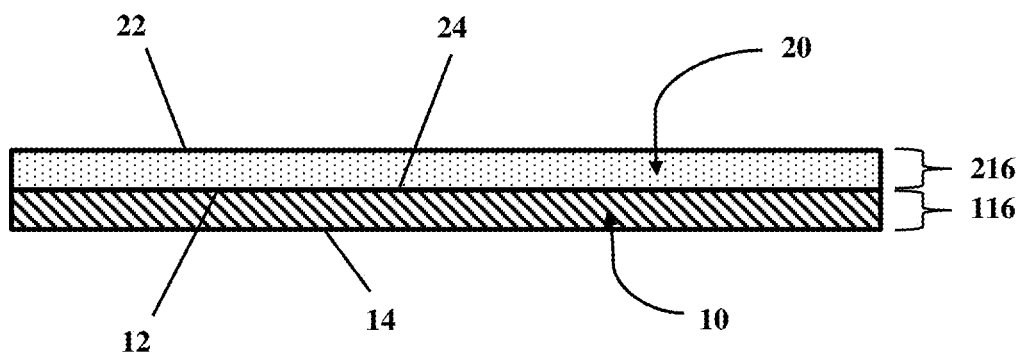
FIG. 2 shows a cross-section of a biodegradable polymeric layer 20 coated onto a biodegradable paper layer 10.

FIG. 2 shows a cross-section of a biodegradable polymeric barrier layer 20 having a first surface 22 and a second surface 24 opposite the first surface 22, and a thickness 216 between the first surface 22 and the second surface 24, applied to substantially cover at least one of the first surface 12 or the second surface 14 of the biodegradable paper layer 10.

The thickness 216 of the biodegradable polymeric layer 20 can range from about 1 µm to about 120 µm, preferably from about 1 µm to about 25 µm, more preferably from about 1 µm to about 10 µm, even more preferably between 1 µm to about 5 µm.

The biodegradable polymeric layer 20 comprises at least one biodegradable polymer. Depending on the application, the biodegradable polymer can be either water-soluble or water insoluble. If it is chosen to be water-soluble, the biodegradable polymer(s) can be selected from among available options to dissolve in water at 23° C., temperature within seconds, or minutes, or hours. A biodegradable polymer requiring more than 24 hours to dissolve in water at 23° C., temperature will not be considered as water-soluble.

Figure 3:
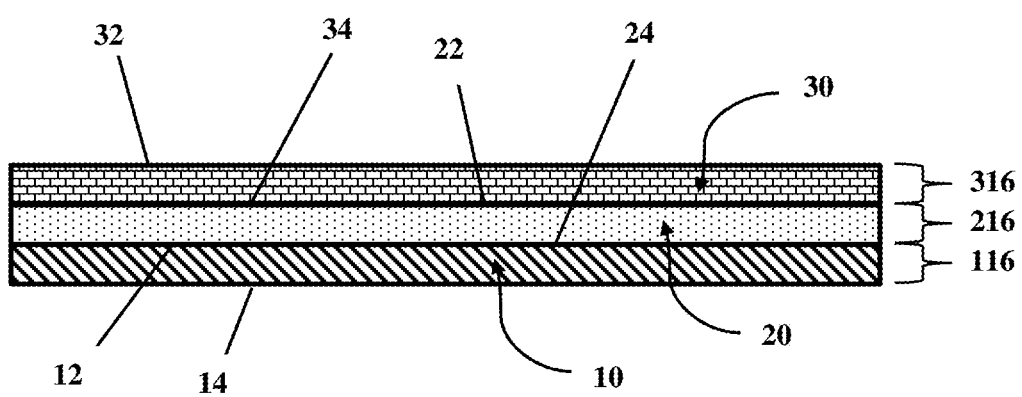
FIG. 3 shows a cross-section of a water-dispersible nanoplatelets layer 30 coated onto a biodegradable polymeric layer 20 coated onto a biodegradable paper layer 10.

FIG. 3 shows a cross-section of a water-dispersible barrier layer 30 having a first surface 32 and a second surface 34 opposite the first surface 32, and a thickness 316 between the first surface 32 and the second surface 34, applied to substantially cover at least one of the first surface 22 or the second surface 24 of the biodegradable polymeric layer 20.

The thickness of the water-dispersible barrier layer 30 ranges from about 0.1 µm to about 20 µm, preferably from about 0.1 µm to about 10 µm, more preferably from about 0.1 µm to about 5 µm.

The water-dispersible barrier layer 30 contains 90-100% nanoplatelets, more preferably 96% to 100% nanoplatelets, even more preferably 99-100% nanoplatelets, such as sodium Cloisite® or sodium hectorite, and is substantially free from other materials in the interstices between the assembled nanoplatelets, such as binders, dispersants, surfactants, or polymers. This means that the cohesion of the nanoplatelets layer is solely provided by the interactions between the nanoplatelets and the adhesion to the biodegradable polymeric layers. The absence of binders (interstitial materials) in the nanoplatelets layer maximizes the barrier performance of the nanoplatelets layer against water permeation whilst maintaining the dispersibility of the hydrophilic nanoplatelets in water once the top/bottom biodegradable polymeric layers are removed via dissolution and/or disintegration in water, either if they are sent for paper recycling or if they are incorrectly disposed in an environment where water is present. A nanoplatelet requiring more than 24 hours to disperse in water at 23° C., temperature will not be considered as dispersible in water.

Nanoplatelets are plate-like nanoparticles characterized by high aspect ratio between the diameter and the orthogonal height. The high aspect ratio enables a "brick wall' to be formed where nanoplatelets lay down parallel to the surface of the underlying biodegradable polymeric layer, overlapping each other and laying on top of each other, thus lowering drastically the migration of molecules, whether gaseous or liquid, through the nanoplatelets layer. The higher the aspect ratio, the higher the barrier performance that can be obtained. Typical aspect ratio for montmorillonite exfoliated nanoplatelets is about 100 or more (Cadène et all, JCIS 285(2):719-30 •June 2005).

The water-dispersible barrier layer 30 according to the present invention may be optically opaque, preferably translucent, even more preferably transparent, depending on the nanoplatelets material (exfoliation level, impurities level) and the nanoplatelets application process.

Preferably, the water-dispersible barrier layer 30 is somewhat flexible. When converting the paper-based structure through a line for printing, sheeting, slitting, rewinding and other typical converting operations, or when making articles such as pouches, comprising the biodegradable paper barrier laminate, the entire biodegradable paper barrier laminate structure is typically folded, bent and sometimes stretched slightly. This can cause some barrier layers to break which could reduce their performance as a barrier. It is thus preferred that the barrier layer 30 is somewhat flexible and can be stretched without breaking, as the rest of the structure is stretched. Preferably, the barrier layer 30 can be elongated at least 1%, at least 2%, at least 5%, as the underlying paper layer and biodegradable polymeric layers stretch. In some cases, it may be desired for the barrier layer to stretch as much as 10% or even as much as 20%, without breaking. In one embodiment, this is achieved by splitting the water-dispersible barrier layer in multiple distinct water-dispersible barrier sublayers separated by multiple distinct water-soluble polymeric sublayers.

Figure 4:
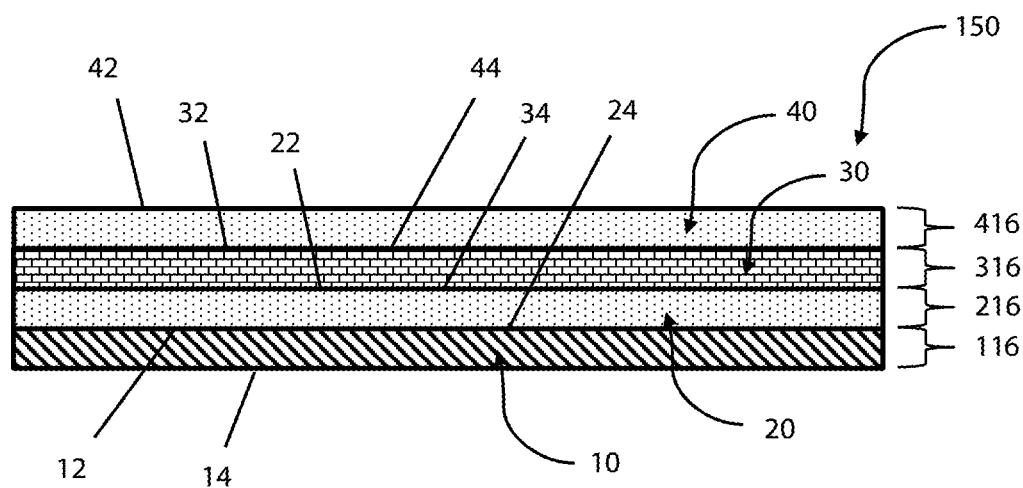
FIG. 4 shows a cross-section of one embodiment of a biodegradable paper barrier laminate according to the present invention which consists of a biodegradable polymeric layer 40 coated onto a water-dispersible nanoplatelets layer 30 coated onto a biodegradable polymeric layer 20 coated onto a biodegradable paper layer 10.

FIG. 4 shows a cross-section of a biodegradable paper barrier laminate 150 comprising a biodegradable paper layer 10 having a first surface 12 and a second surface 14 opposite to the first surface 12 and a thickness 116 between the first surface 12 and the second surface 14. To the biodegradable paper layer is attached a first biodegradable polymeric layer 20 with a first surface 22 and a second surface 24, opposite to the first surface 22 and a thickness 216 between the first surface 22 and the second surface 24 and substantially covers at least one of the first or second surfaces 12, 14 of the paper layer 10. To the first biodegradable polymeric layer is attached a water-dispersible barrier layer 30 having a first surface 32 and a second surface 34 opposite to the first surface 32 and a thickness 316 between the first surface 32 and the second surface 34 and substantially covers the second surface 24 of the biodegradable polymeric layer 20. To the water-dispersible barrier layer is attached a second biodegradable polymeric layer with a first surface 42 and a second surface 44, opposite to the first surface 42 and a thickness 416 between the first surface 42 and the second surface 44 and substantially covers the surface 32 of the water-dispersible barrier layer 30. The adhesion between the layers is provided by the interactions between the biodegradable polymers and the hydrophilic nanoplatelets.

The thickness of the biodegradable polymeric layer 40 between the first surface 42 and the second surface 44 can range from about 1 μm to about 1000 μm, preferably from about 1 μm to about 200 μm, more preferably from about 1 μm to about 40 μm.

The biodegradable polymeric layer 40 comprises at least one biodegradable polymer. Depending on the application, the biodegradable polymer(s) can be selected to be water-soluble or water insoluble. If the application requires a water-soluble polymer, it can be chosen from among available water-soluble polymer options to dissolve in water at 23° C., temperature within seconds, or minutes, or hours. A polymer requiring more than 24 hours to dissolve in water at 23° C. temperature will not be considered as water-soluble.

Each layer according to the present invention is distinct and separated from the others. By distinct, it is meant that the barrier layer 30 between the biodegradable polymeric layers 20 and 40 comprises substantially nanoplatelets only, and that the boundaries between the barrier layer 30 and the surrounding biodegradable polymeric layers 20 and 40 are distinguished by a large composition change over a small distance, creating a sharp boundary that is readily visible by microscopy techniques known in the art. The boundary layer, i.e. the intermediate layer of intermediate composition between the water-dispersible nanoplatelets layer and the adjacent biodegradable polymeric layer, is no more than 2 μm thick, seen by microscopy techniques known in the art.

Figure 6:
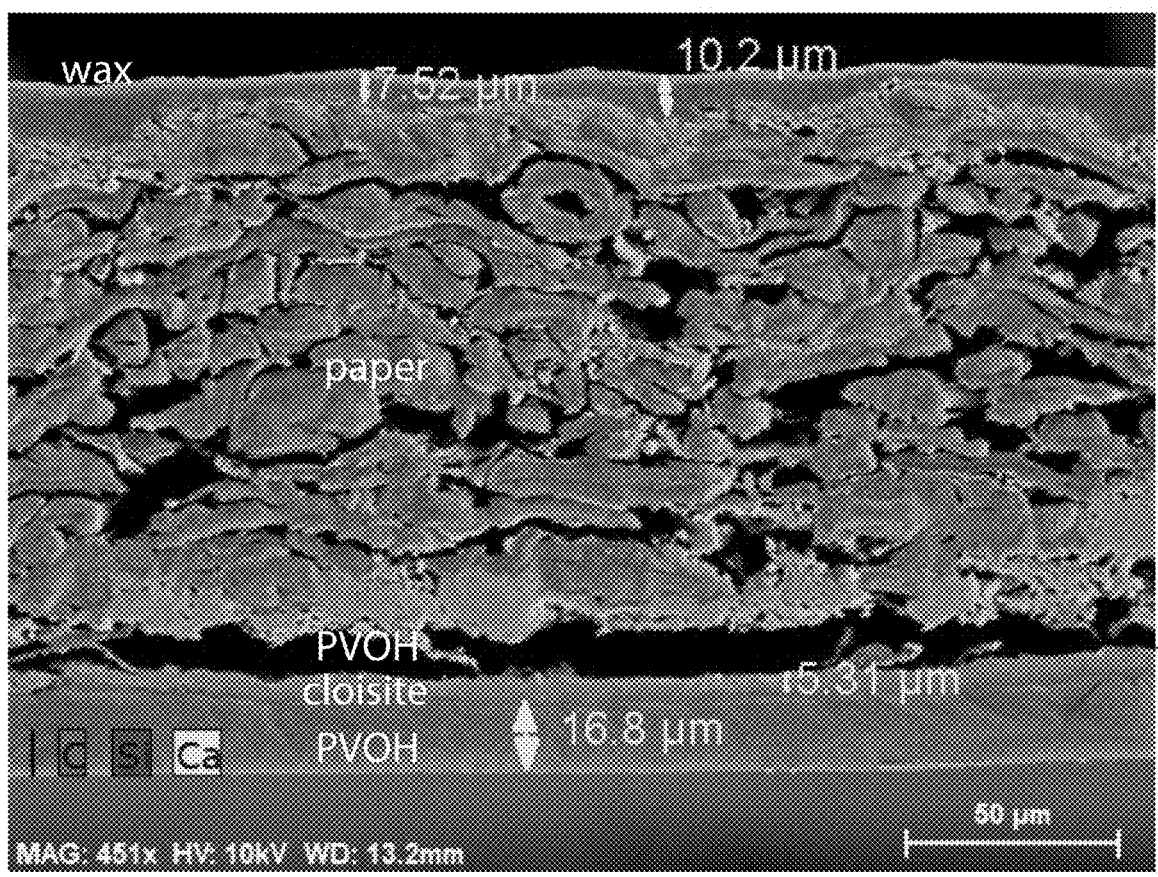
FIG. 6 shows a cross-sectional image obtained via scanning electron microscopy combined with energy-dispersive spectroscopy of one embodiment of biodegradable paper barrier laminate.

FIG. 6 shows a cross-sectional image obtained via Scanning Electronic Microscope (SEM) of a biodegradable paper barrier laminate consisting of a biodegradable paper layer coated with a first water-soluble biodegradable polyvinyl alcohol layer, a water-dispersible Cloisite® barrier layer, and a second water-soluble biodegradable polyvinyl alcohol layer. The second water-soluble biodegradable polyvinyl alcohol layer is less visible than the first one because it is much thinner. EDX color coding helps to emphasize the difference in chemistry of each layer.

When the biodegradable paper barrier laminate according to the present invention is immersed in water (e.g. paper recycling process if waste is managed, or aqueous environments if waste is improperly littered), the biodegradable polymeric layers will be dissolved and/or disintegrated and its components digested by bacteria, either in water treatment plants if recycled, or in aqueous environments (rivers, sea) if improperly littered, or in composting systems if the package is composted. Without the surrounding and supporting water-soluble polymeric layers, immersed in water, the water-dispersible barrier layer will break up, and the nanoplatelets will be digested as organic carbon in case of graphene or graphene oxide, or will be dispersed as minerals enriching soils in case of natural clays or micas, no matter whether the waste is preferably managed or improperly littered. This leaves the paper layer completely uncoated and readily biodegradable or recyclable, since the paper layer is selected among biodegradable and recyclable grades.

All embodiments of the present invention are compatible with current paper recycling systems, i.e. these embodiments must disintegrate readily when stirred into large volumes of warm water. For typical current industrial repulping facilities, the paper-based package must fall apart within 5-20-minutes of immersion in warm water under constant vigorous stirring.

If improperly littered in the environment, the package must also fall apart quickly, thus exposing the maximum surface area to the bacteria responsible for the biodegradation, ensuring full digestion in a reasonable time. Preferably, the package would biodegrade within a 6-12 months. And if the package is composted, it must undergo full digestion within the normal time expected of a compostable package.

The biodegradable paper barrier laminate according to the invention may comprise a printed area. Printing may be achieved using standard printing techniques, such as flexographic, gravure, or inkjet printing. The biodegradable paper barrier laminate according to the invention may comprise a surface coating for artwork protection purposes against incidental water, or for matt/gloss effects.

Paper

The cellulose fibers used to make the paper may be sourced from softwoods, hardwoods and also non-tree fibers which typically have shorter fibers including bamboo, grass, hemp, kenaf, flax, corn husks, cotton stalks, coffee grounds, bagasse, rice straw, wheat straw; algae, abaca, sabia grass, esparto grass, milkwood floss fibers, pineapple leaf fibers, wood fibers, pulp fibers and others.

The paper used for making biodegradable paper barrier laminates of the present disclosure is biodegradable without leaving any persistent materials in the environment and is also preferably recyclable in typical paper recycling streams. Indeed, papers are not made from 100% cellulose fibers only, but also contain polymeric binders, mineral sizing agents, whitening agents, surfactants, and other additives. These other ingredients must be selected appropriately to ensure that (a) the paper will biodegrade if improperly disposed in the environment, or (b) the paper will disintegrate in the repulping unit at a paper recycler and release the maximum cellulose fibers for making recycled paper.

The effectiveness of the recycling process may be determined via recyclable percentage. The recyclable percentage of the paper barrier laminate of the present disclosure is determined via test method PTS-RH:021/97 (draft oct. 2019) under category II, performed by Papiertechnische Stiftung located at Pirnaer Strasse 37, 01809 Heidenau, Germany. Along with recyclable percentage, the total reject percentage is determined via PTS-RH: 021/97 (draft oct. 2019) under category II. The total reject percentage of the package material of the present disclosure may be 40 percent or less, 30 percent or less, or 10 percent or less, specifically including all values within these ranges and any ranges formed therein or thereby. For example, the total rejection percentage of the package material of the present disclosure may be from about 0.5 percent to about 40 percent, from about 0.5 percent to about 30 percent, or from about 0.5 percent to about 10 percent, specifically reciting all values within these ranges and any ranges formed therein or thereby.

It is believed that the percent non-recyclable material does not necessarily have a 1:1 correlation to the total reject percentage. For example, dissolvable adhesives and/or coatings are designed to dissolve during the recycling process. It is theorized that these adhesives may not have an impact on the total reject percentage; however, they would contribute to the non-recyclable material weight percent.

The test method PTS-RH:021/97 (draft oct. 2019) under category II also comprises a visual component. Trained screeners inspect one or more sheets of recycled package material for visual imperfections. If the number of visual imperfections is too great, then the package material is rejected. If the number of visual imperfections is acceptable, in accordance with the test method PTS-RH:021/97 (draft oct. 2019) under category II, then the package material is approved for additional processing. The paper barrier laminate of the present disclosure may yield an acceptable level of visual imperfections during this step of the method.

The paper barrier laminate of the present disclosure may yield the recyclable percentages mentioned heretofore as well as pass the visual screening method. Thus, the paper barrier laminate of the present disclosure may achieve an overall score or final outcome of "pass" when subjected to the test method PTS-RH:021/97 (draft oct. 2019) under category II.

It is also worth noting that there is an alternative method for determining the recyclable percentage of the paper barrier laminate of the present disclosure. The test method performed by the University of Western Michigan, called repulpability test method, may provide a percent yield of recyclable material. While there are subtle differences between the repulpability test method performed by Western Michigan and the test method PTS-RH:021/97 (draft oct. 2019) under category II, it is believed that the percentage yield of the repulpability test method would be similar to the recyclable percentage provided by the method PTS-RH:021/97 (draft oct. 2019) under category II.

For commercial reasons, it is also important that paper recyclers can obtain at least 50 percent by weight of cellulose fibers from an incoming batch of paper waste. For this reason, it is preferred that the paper layer itself comprises at least between 50% and 100% by weight of cellulose fibers, more preferably between 65% and 90% by weight of cellulose fibers, most preferably between 75% and 95% by weight of cellulose fibers.

It is contemplated that the biodegradable paper of the present disclosure while being recyclable may itself comprise recycled material. For example, the biodegradable paper of the present invention may comprise more than 10% by weight, preferably more than 20% by weight, more preferably more than 30% by weight of recycled material, specifically reciting all values within these ranges and any ranges created thereby. The biodegradable paper may comprise virgin or recycled paper or mixtures thereof between 0% and 100%.

The presence of recycled material can be detected from a visual inspection of the package. Typically, manufacturers would advertise the use of recycled materials to demonstrate their eco-friendly profile. To do so, they may utilize a logo, such as a leaf, and words indicating the use of recycled material in the package. Manufacturers may also specify the percentage of recycled material utilized as well, e.g. over 50 percent, over 70 percent, etc.

Visual inspection can be as simple as utilizing the human eye to search for logos about the use of recycled material. Additionally, or alternatively, visual inspection may include microscopy methods such as optical microscopy, scanning electron microscopy or other suitable methods known in the art. For example, package material comprising recycled paper fibers may appear different under a microscope due to the presence of a much broader range of natural fibers than if the package material comprised 100% virgin fibers.

It is preferable that the paper is as flat as possible on at least one side, the side that is subsequently coated with an aqueous polymeric system to form an adjacent water-borne biodegradable polymeric layer. The paper may be flattened via "sizing", which in the industry means that it is coated with an aqueous polymeric suspension containing various inorganic fillers such as clays, calcium carbonate and/or titanium dioxide, the suspension is then dried and the paper calendered to deliver a flatter surface than before sizing, as the inorganic fillers and binders dry down to fill in the porous rough surface of the paper. Alternatively, the paper may be machine glazed during the paper manufacturing process via a mechanical ironing/pressing step that sometimes involves heat—in this case the paper fibers are squashed together and flattened in order to densify the paper surface and remove porosity. In some cases, sizing and machine glazing are combined to get an even flatter more perfect surface during paper manufacturing, before subsequently being coated with the water-borne biodegradable polymeric layers. In other cases, a vellum or glassine or tracing paper might be used which are already naturally very flat—such papers are made by a process that during the manufacturing densifies the paper structure throughout its entire thickness process and further sizing or glazing is not required.

Examples of papers suitable for making a biodegradable paper barrier laminate include Leine Nature® paper (grammage 85 g/m$^2$) from Sappi (Johannesburg, South Africa), a machine glazed paper certified "OK Home Compost"; NiklaSelect® V Natural Linen paper (99 g/m$^2$) from Birgl & Bergmeister GmbH (Niklasdorf, Austria), a paper sized on one side only; PackPro® 7.0 paper (65 g/m$^2$) from Birgl & Bergmeister, a paper sized on both sides: Axello® papers from BillerudKorsnäs (Solna, Sweden), (including from Axello® Tough White paper, 80 g/m$^2$) which has been designed to be tougher than many other papers and so may have some advantages in the distribution chain: SCG Glassine® paper (58 g/m$^2$) from SCG/Prepack.

As shown in the Table 1 below, these papers pass the paper recycling protocols at both Western Michigan University in the USA and PTS Institute in Germany. These papers also pass the OECD 301B biodegradation screening test by undergoing at least 60% biodegradation within 28 days.

As an example, Table 2 below shows the properties of Axello® Tough White paper grade from BillerudKorsnäs or Advantage Smooth White Strong from Mondi.

TABLE 2

| Property | Method | Unit | Orientation | Axello® Tough White | Advantage Smooth White Strong |
|---|---|---|---|---|---|
| Basis Weight | ISO536 | g/m$^2$ | — | 80 | 70 |
| Caliper | ISO536 | μm | — | n/a | 89 |
| Tensile Strength | ISO1924-3 | kN/m | MD | 7.6 | 5.9 |
| | | | CD | 4.7 | 3.0 |
| Maximum Stretch | ISO1924-3 | % | MD | 4.5 | 2.5 |
| | | | CD | 8.0 | 8.0 |
| Tensile Energy Absorption | ISO1924-3 | J/g | MD | 185 | n/a |
| | | | CD | 240 | n/a |
| Burst Strength | ISO2758 | kPa | MD | 480 | 256 |

Biodegradable Water-Borne Polymers that are Water Insoluble

In some embodiments it is preferred that at least one of the biodegradable polymeric layers is made from a water insoluble polymer. These materials are commonly referred to as "bioplastics" as well as biodegradable polymers.

In one instance, biodegradable aliphatic polyesters and copolyesters can be produced by large-scale bacterial fermentation. Collectively termed polyhydroxyalkanoates, also known as "PHAs", these polymers can be harvested from plant or bacteria fed with a particular substrate, such as glucose, in a fermentation plant. In many instances, the

TABLE 1

| Paper Grade | Western Michigan Paper Recycling Protocol | PTS Paper Recycling Protocol | OECD 301B Biodegradation Test |
|---|---|---|---|
| Leine Nature® 85 g/m$^2$ Sappi | PASS | PASS | PASS |
| NiklaSelect V Natural Linen 100 g/m$^2$ Birgl & Bergmeister | PASS | PASS | PASS |
| PackPro 7.0 80 g/m$^2$ Birgl & Bergmeister | PASS | PASS | PASS |
| Axello® Tough White 80 g/m$^2$ BillerudKorsnäs | PASS | PASS | PASS |
| Glassine 58 g/m$^2$ SCG Packaging | Not yet tested (passed internal SCG recycling protocols) | Not yet tested (passed internal SCG recycling protocols) | PASS |

To withstand the stress of high-speed manufacturing processes (where products are placed within packages made from laminates disclosed in the present invention) as well as the stress of shipment, the paper layer must be sufficiently strong and resilient. There are myriad of ways to specify the paper layer. The metrics discussed below are MD tensile strength in kN/m, CD tensile strength in KN/m, MD stretch in percent, CD stretch in percent, MD burst strength in kPa, caliper in μm, MD tensile energy absorption in J/g, CD tensile energy absorption in J/g, and grammage in g/m$^2$. Whilst all the metrics may be utilized in conjunction to select a suitable paper in the present invention, some metrics alone or in conjunction with others may suffice as well.

In cases where it is necessary to use a very tough paper to maintain the physical integrity of the water-dispersible barrier layer, Axello® papers from BillerudKorsnäs are preferred.

structural or mechanical properties of PHAs can be customized to fit the specifications of the desired application. PHAs and their copolymers can degrade both aerobically and anaerobically. This makes them particularly well suited for composting or rapidly and completely degrading in the environment. Such bioplastics are typically suspended in aqueous emulsions and can be dried into films on various substrates, although they can also be extruded into films and coatings.

The PHA can be obtained as copolymers that are commercialized as film grades for extrusion and blowing from ShenZhen Ecomann Biotechnology Co., Danimer Scientific, Inc., which produces poly (beta-hydroxyalkanoate), poly(3-hydroxy butyrate-co-3-hydroxyhexanoate) NODAX™), or Kaneka which produces poly (3-hydroxy butyrate-co-3-hydroxyhexanoate). Non-limiting examples of PHA copolymers include those described in U.S. Pat. No. 5,498,692. Other PHA copolymers can by synthesized by methods known to one skilled in the art, such as, from microorganisms, the ring-opening polymerization of beta-lactones, the dehydration-polycondensation of hydroxyalkanoic acid, and the dealcoholization-polycondensation of the alkyl ether of hydroxyalkanoic acid, as described in Volova, "Polyhydroxy Alkanoates Plastic Materials of the 21" Century: Production, Properties, and Application, Nova Science Publishers, Inc., (2004), incorporated herein by reference.

Other possible biodegradable water insoluble polymers could include biodegradable thermoplastic material selected from the group consisting of aliphatic aromatic polyesters (e.g., ECOFLEX® from BASF which is a polybutylene adipate terephthalate (PBAT)), blends of polylactic acid (PLA) with poly butylene adipate terephthalate; and thermoplastic starches (e.g., MATER-BI from Novamont or PLANTIC® from Plantic/Kuraray), polybutylene succinate (PBS) and copolymers thereof (e.g., BIONOLLE® from ShoWa High polymer Co, or polybutylene succinate adipate (PBSA) from Mitsubishi Chemicals, Tokyo, Japan) and mixtures thereof.

Biodegradable Water-Borne Polymers that are Water-Soluble

In some embodiments it is preferred that at least one of the biodegradable polymeric layers is made from a water-soluble polymer. Preferred polymers, copolymers or derivatives thereof suitable for use as water-soluble polymeric layer are selected from polyvinyl alcohol (PVOH), polyvinyl alcohol copolymers such as butenediol-vinyl alcohol copolymers (BVOH), which are produced by copolymerization of butenediol with vinyl acetate followed by the hydrolysis of vinyl acetate, suitable butenediol monomers being selected from 3,4-diol-1-butene, 3,4-diacyloxy-1-butenes, 3-acyloxy-4-ol-1-butenes, 4-acyloxy-3-ol-1-butenes and the like; polyvinyl pyrrolidone; polyalkylene oxides, such as polyethylene oxides or polyethylene glycols (PEG); poly (methacrylic acid), polyacrylic acids, polyacrylates, acrylate copolymers, maleic/acrylic acids copolymers; polyacrylamide; poly (2-acrylamido-2-methyl-1-propanesulfonic acid (poly AMPS); polyamides, poly-N-vinyl acetamide (PNVA); polycarboxylic acids and salts: cellulose derivatives such as cellulose ethers, methylcellulose, hydroxyethyl cellulose, carboxymethylcellulose; hydroxypropyl methylcellulose: natural gums such as xanthan and carrageenan gum: sodium alginates; maltodextrin, low molecular weight dextrin; polyamino acids or peptides; proteins such as casein and/or caseinate (e.g. such as those commercialized by Lactips).

The most preferred water-soluble biodegradable polymer is polyvinyl alcohol, polyethylene oxide, methylcellulose and sodium alginate. For applications where a "plastic free" product is desired, the majority component of the water-soluble polymer layer may be a naturally derived polymer, such as sodium alginate. Preferably, the level of biodegradable polymer in the water-soluble polymeric layer is at least 60%.

The water-soluble biodegradable polymer has an average molecular weight (measured by gel permeation chromatography) of about 1,000 Da to about 1,000,000 Da, or any integer value from about 1,000 Da to about 1,000,000 Da, or any range formed by any of the preceding values such as about 10,000 Da to about 300,000 Da, about 20,000 Da to about 150,000 Da, etc. More specifically polyvinyl alcohol would have a molecular weight in the range of 30,000-150,000 Da. Polyethylene oxide would have molecular weight in the range of 50,000 Da to 400,000 Da. Methylcelluloses would have a molecular weight in the range 10,000 Da to 100,000 Da. Sodium alginate would have a molecular weight in the range 10,000 to 240,000 Da.

If homopolymer polyvinyl alcohol is used, the degree of hydrolysis could be 70-100%, or any integer value for percentage between 70% and 100%, or any range formed by any of these values, such as 80-100%, 85-100%, 90-100%, 95-100%, 98-100%, 99-100%, 85-99%, 90-99%, 95-99%, 98-99%, 80-98%, 85-98%, 90-98%, 95-98%, 80-95%, 85-95%, 90-95%, etc.

Biodegradable Adhesives

Solution-based or solvent-based adhesive compositions may also be used to adhere the film to the substrate. Non-limiting examples of the adhesive can include acrylic, polyvinyl acetate, polyester-polyurethane elastomers and other commonly used adhesive tie layers suitable for polar materials. One commercially available example is Epotal 3702 from BASF. In some embodiments, the adhesive is a renewable adhesive, such as BioTAK® by Berkshire Labels.

Optional Ingredients

The biodegradable polymeric layers of the biodegradable paper barrier laminate that are water-soluble may contain disintegrants, plasticizers, surfactants, lubricants/release agents, fillers, extenders, antiblocking agents, detackifying agents, antifoams, or other functional ingredients.

It may be required for certain applications that the biodegradable polymeric layers that are water-soluble contain disintegrants to increase their dissolution rate in water. Suitable disintegrants are, but are not limited to, corn/potato starch, methyl celluloses, mineral clay powders, croscarmellose (cross-linked cellulose), crospovidone (cross-linked polyvinyl N-pyrrolidone, or PVP), sodium starch glycolate (cross-linked starch). Preferably, the water-soluble polymeric layers comprise between 0.1% and 15%, more preferably from about 1% to about 15% by weight of disintegrants.

In some embodiments, the biodegradable polymeric layers that are water-soluble may contain water-soluble plasticizers. Preferably, the water-soluble plasticizer is selected from water, polyols, sugar alcohols, and mixtures thereof. Suitable polyols include polyols selected from the group consisting of glycerol, diglycerol, ethylene glycol, diethylene glycol, triethylene glycol, tetraethylene glycol, polyethylene glycols up to 400 Da molecular weight, neopentyl glycol, 1,2-propylene glycol, 1,3-propanediol, dipropylene glycol, polypropylene glycol, 2-methyl-1,3-propanediol, methylene glycol, trimethylolpropane, hexylene glycol, neopentyl glycol, and polyether polyols, or a mixture thereof. Suitable sugar alcohols include sugar alcohols selected from the group consisting of isomalt, maltitol, sorbitol, xylitol, erythritol, adonitol, dulcitol, pentaerythritol and mannitol, or a mixture thereof. In some cases, the plasticizer could be selected from the following list: ethanolamine, alkyl citrate, isosorbide, pentaerythritol, glucosamine, N-methylglucamine or sodium cumene sulfonate. Less mobile plasticizers such as sorbitol or polyethylene oxide can facilitate the formation of water-soluble polymeric layers with greater barrier properties than water-soluble polymeric layers including a more mobile plasticizer such as glycerol. In some circumstances when there is a desire to use as many naturally derived materials as possible, the following plasticizers could also be used: vegetable oil, polysorbitol, dimethicone, mineral oil, paraffin, $C_1$-$C_3$ alcohols, dimethyl sulfoxide. N. N-dimethylacetamide, sucrose, corn syrup, fructose, dioctyl sodium-sulfosuccinate, triethyl citrate, tributyl citrate, 1,2-propylene glycol, mono, di- or triacetates of glycerin, natural gums, citrates, and mixtures thereof.

More preferably, water-soluble plasticizers are selected from glycerol, 1,2-propanediol, 20 dipropylene glycol, 2-methyl-1,3-propanediol, trimethylolpropane, triethylene glycol, polyethylene glycol, sorbitol, or a mixture thereof, most preferably selected from glycerol, sorbitol, trimethylolpropane, dipropylene glycol, and mixtures thereof. Preferably, the water-soluble polymeric layers comprise between 5% and 50%, more preferably between 10% and 40%, even more preferably from about 12% to about 30% by weight of plasticizers.

In some embodiments, the biodegradable polymeric layers comprise a surfactant. Suitable surfactants may belong to the non-ionic, cationic, anionic or zwitterionic classes. Suitable surfactants are, but are not limited to, poloxamers (polyoxyethylene polyoxypropylene glycols), alcohol ethoxylates, alkylphenol ethoxylates, tertiary acetylenic glycols and alkanolamides (nonionic), polyoxyethylene amines, quaternary ammonium salts and quaternized polyoxyethylene amines (cationic), and amine oxides, N-alkylbetaines and sulfobetaines (zwitterionic). Other suitable surfactants are dioctyl sodium sulfosuccinate, lactylated fatty acid esters of glycerol and propylene glycol, lactylic esters of fatty acids, sodium alkyl sulfates, polysorbate 20, polysorbate 60, polysorbate 65, polysorbate 80, lecithin, acetylated fatty acid esters of glycerol and propylene glycol, and acetylated esters of 5 fatty acids, and combinations thereof. Preferably, the water-soluble polymeric layers comprise between 0.1% and 2.5%, more preferably from about 1% to about 2% by weight of surfactants.

In some embodiments, the biodegradable polymeric layers according to the invention comprise lubricants/release agents. Suitable lubricants/release agents are, but are not limited to, fatty acids and their salts, fatty alcohols, fatty esters, fatty amines, fatty amine acetates and fatty amides. Preferred lubricants/release agents are fatty acids, fatty acid salts, fatty amine acetates, and mixtures thereof. Preferably, the water-soluble polymeric layers comprise between 0.02% to 1.5%, more preferably from about 0.1% to about 1% by weight of lubricants/release agents.

In some embodiments, the biodegradable polymeric layers according to the invention comprises fillers, extenders, antiblocking agents, detackifying agents. Suitable fillers, extenders, antiblocking agents, detackifying agents are, but are not limited to, starches, modified starches, crosslinked polyvinylpyrrolidone, crosslinked cellulose, microcrystalline cellulose, silica, metallic oxides, calcium carbonate, talc and mica. Preferably, the biodegradable polymeric layers comprise between 0.1% to 25%, more preferably from about 1% to about 15% by weight of fillers, extenders, antiblocking agents, detackifying agents. In absence of starch, the biodegradable polymeric layers comprise preferably between 1% to 5% by weight of fillers, extenders, antiblocking agents.

In some embodiments, the water-borne biodegradable polymeric layers that are water-soluble according to the invention comprise antifoams. Suitable antifoams are, but are not limited to, polydimethylsiloxanes and hydrocarbon blends. Preferably, the water-soluble polymeric layers comprise between 0.001% and 0.5%, more preferably from about 0.01% to about 0.1% by weight of antifoams.

The biodegradable paper barrier laminate according to the invention may contain residual moisture depending on the hygroscopy and the isotherm of the laminate components at given temperature and humidity conditions measured by Karl Fischer titration. For instance, water-soluble polyvinyl alcohol may contain about 4-8% residual moisture at 23° C., and 50% r.H.

Water-Dispersible Nanoplatelets

Nanoplatelets are solid plate-like nanoparticles characterized by high aspect ratio between the diameter and the orthogonal height. High aspect ratio delivers a parallel arrangement of the nanoplatelets, and a longer diffusion path length for chemicals through the nanoplatelets, thus delivering barrier functionality. It is desirable that nanoplatelets are free from defects such as cracks and holes lowering the barrier performance. It is also desirable that nanoplatelets are easily exfoliated in water, both for application purpose (e.g. wet coating) and end-of-life scenarios (e.g. wastewater treatment plants), but highly cohesive when dried. Nanoplatelets are currently used in the industry as rheological modifier, flame retardant, anticorrosion coating and/or chemical barrier. Nanoplatelets can be obtained from natural sources and used as such, or can purified and modified from natural sources, or can be synthetised in furnaces for purity and performance reasons.

Natural phyllosilicates, such as serpentine, clay, chlorite and mica, consist of nanoplatelets stacked together. Natural clays, such as kaolinite, pyrophyllite, vermiculite and smectite, consist of nanoplatelets stacked together, swelling in presence of water. Smectites, such as montmorillonite and hectorite, consist of nanoplatelets stacked together, swelling the most in presence of water. Natural smectites can be purified and modified, such as sodium Cloisite® from BYK, obtained from bentonite, a natural mineral containing 60-80% montmorillonite, and cationic exchanged with monovalent sodium for exfoliation purposes. Smectites can be also synthetised, such as laponite from BYK, and sodium hectorite from the University of Bayreuth. Other nanoplatelets are graphene and graphene oxides, such as those supplied by Applied Graphene Materials, and are also characterized by high aspect ratio between the diameter and its orthogonal height.

Methods of Making a Biodegradable Paper Barrier Laminate

Figure 5:
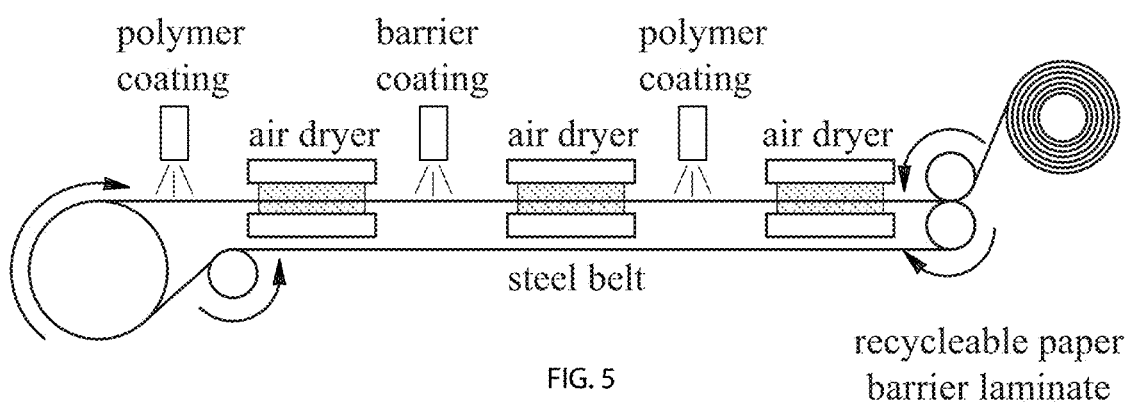
FIG. 5 shows a schematic representation of a method of making a biodegradable paper barrier laminate according to the present invention.

There are numerous non-limiting embodiments of the method of making the biodegradable paper barrier laminate described herein. As shown in FIG. 5, a biodegradable paper barrier laminate with an integrated water-dispersible barrier may be produced in multiple steps of coating and drying of aqueous water-soluble polymeric solution, or aqueous water-borne polymeric dispersion, and aqueous nanoplatelets dispersion, under specific conditions.

If aqueous water-borne polymeric dispersions are used to make a biodegradable polymeric layer, an additional heating and calendering step might be useful to flatten it out. In some embodiments, the biodegradable polymeric layer might be obtained instead via thermal extrusion coating or might be attached via biodegradable tie layers to form the biodegradable paper barrier laminate.

In a first embodiment, a method of making the biodegradable paper barrier laminate comprises:
- a) applying a first aqueous system of a water-borne biodegradable polymeric composition onto the surface of a removeable flat carrier, such as a PET film, stainless steel belt, fluorinated polymeric belt, or any other suitable carrier materials 50
- b) removing the water from the first aqueous system of a water-borne biodegradable polymeric composition to obtain a first biodegradable polymeric layer 40
- c) applying an aqueous dispersion of hydrophilic nanoplatelets onto the outer surface of the first biodegradable polymeric layer 40
- d) removing the water from the aqueous dispersion of hydrophilic nanoplatelets to obtain a water-dispersible barrier layer 30 e) applying a second aqueous system of a water-borne polymeric composition onto the inner surface of a biodegradable paper layer 10 f) combining the outer surface of the water-dispersible barrier layer 30 onto the second aqueous system of said water-borne polymeric composition g) removing the water from the second aqueous system of a water-borne biodegradable polymeric composition to obtain a second biodegradable polymeric layer 20 h) removing the flat carrier from the resulting biodegradable paper barrier laminate 150

In a second embodiment, a method of making a biodegradable paper barrier laminate comprises:
- a) applying a first aqueous system of a water-borne biodegradable polymeric composition onto the surface of a removeable flat carrier, such as a PET film, stainless steel belt, fluorinated polymeric belt, or any other suitable carrier materials 50
- b) removing the water from the first aqueous system of a water-borne biodegradable polymeric composition to obtain a first biodegradable polymeric layer 40
- c) applying heat to the first biodegradable polymeric layer 40 to form a flat and continuous first biodegradable polymeric layer 40
- d) applying an aqueous dispersion of hydrophilic nanoplatelets onto the outer surface of the first biodegradable polymeric layer 40
- e) removing the water from the aqueous dispersion of hydrophilic nanoplatelets to obtain a water-dispersible barrier layer 30
- f) applying a second aqueous system of a water-borne polymeric composition onto the inner surface of a biodegradable paper layer 10
- g) combining the outer surface of the water-dispersible barrier layer 30 onto the second aqueous system of said water-borne polymeric composition
- h) removing the water from the second aqueous system of a water-borne biodegradable polymeric composition to obtain a second biodegradable polymeric layer 20
- i) removing the flat carrier from the resulting biodegradable paper barrier laminate 150

In a third embodiment, a method of making a biodegradable paper barrier laminate comprises:
- a) applying a first aqueous system of a water-borne biodegradable polymeric composition onto the inner surface of a biodegradable paper layer 10, inner surface being sized, glazed, or both sized and glazed
- b) removing the water from the first aqueous system of a water-borne polymeric composition to obtain a first biodegradable polymeric layer 20
- c) applying an aqueous dispersion of hydrophilic nanoplatelets onto the inner surface of the first biodegradable polymeric layer 20
- d) removing the water from the aqueous dispersion of hydrophilic nanoplatelets to obtain a water-dispersible barrier layer 30
- e) applying a second aqueous system of a water-borne biodegradable polymeric composition onto the inner surface of the water-dispersible barrier layer 30
- f) removing the water from the aqueous system of a water-borne biodegradable polymeric composition to obtain a second biodegradable polymeric layer 40

In a fourth embodiment, a method of making a biodegradable paper barrier laminate comprises:
- a) applying a first aqueous system of a water-borne biodegradable polymeric composition to the inner surface of the biodegradable paper layer 10, inner surface being sized, glazed, or both sized and glazed
- b) removing the water from the first aqueous system of a water-borne polymeric composition to obtain a first biodegradable polymeric layer 20
- c) applying heat to the first biodegradable polymeric layer 20 to form a continuous layer of the first biodegradable polymeric layer 20
- d) applying an aqueous dispersion of hydrophilic nanoplatelets onto the inner surface of the first biodegradable polymeric layer 20
- e) removing the water from the aqueous dispersion of hydrophilic nanoplatelets to obtain a water-dispersible barrier layer 30
- f) applying a second aqueous system of a water-borne biodegradable polymeric composition onto the inner surface of the water-dispersible barrier layer 30
- g) removing the water from the aqueous system of a water-borne biodegradable polymeric composition to obtain a second biodegradable polymeric layer 40

These last two methods offer a better bonding strength between the biodegradable paper layer 10 and the water-dispersible barrier layer 30. They are also simpler to practice from an industrial standpoint. But they limit the selection of biodegradable paper to those suitable for coating aqueous polymeric systems, such as those that are sized on at least one side, or are machine glazed on at least one side, or are vellum or glassine papers. In some cases, sizing and machine glazing may be combined to make an even flatter surface of the biodegradable paper 10.

In a fifth embodiment, a method of making a biodegradable paper barrier laminate comprises:
- a) applying a first aqueous system of a water-borne biodegradable polymeric composition onto the inner surface of a biodegradable paper layer 10, inner surface being sized, glazed, or both sized and glazed
- b) removing the water from the first aqueous systems of a water-borne biodegradable polymeric composition to obtain a first biodegradable polymeric layer 20
- c) applying an aqueous dispersion of hydrophilic nanoplatelets onto the inner surface of the first biodegradable polymeric layer 20
- d) removing the water from the aqueous dispersion of hydrophilic nanoplatelets to obtain a water-dispersible barrier layer 30
- e) melting a second biodegradable polymeric composition within an extruder
- f) thermally extruding the molten second biodegradable polymeric composition onto the surface of the water-dispersible barrier layer 30
- g) cooling the molten second biodegradable polymeric composition to form the second biodegradable polymeric layer 40

In a sixth embodiment, a method of making a biodegradable paper barrier laminate comprises:
- a) applying a first aqueous system of a water-borne biodegradable polymeric composition onto the inner surface of a biodegradable paper layer 10, inner surface being sized, glazed, or both sized and glazed
- b) removing the water from the first aqueous systems of a water-borne biodegradable polymeric composition to obtain a first biodegradable polymeric layer 20
- c) applying heat to the first biodegradable polymeric layer 20 to form a continuous layer of the first biodegradable polymeric layer 20 d) applying an aqueous dispersion of hydrophilic nanoplatelets onto the inner surface of the first biodegradable polymeric layer 20 e) removing the water from the aqueous dispersion of hydrophilic nanoplatelets to obtain a water-dispersible barrier layer 30 f) melting a second biodegradable polymeric composition within an extruder g) thermally extruding the molten second biodegradable polymeric composition onto the surface of the water-dispersible barrier layer 30 h) cooling the molten second biodegradable polymeric composition to form the second biodegradable polymeric layer 40

The last two methods do not require the application of a water-borne polymeric composition to form the heat seal layer 40. Instead, the heat seal layer 40 is attached to the water-dispersible barrier layer 30 via thermal extrusion coating of a biodegradable polymeric composition.

In a seventh embodiment, a method of making a biodegradable paper barrier laminate comprises:

a) applying a first aqueous system of a water-borne biodegradable polymeric composition onto the inner surface of the biodegradable paper layer 10, inner surface being sized, glazed, or both sized and glazed b) removing the water from the first aqueous systems of a water-soluble biodegradable polymeric composition to obtain a first biodegradable polymeric layer 20 c) applying an aqueous dispersion of hydrophilic nanoplatelets onto the inner surface of the first biodegradable polymeric layer 20 d) removing the water from the aqueous dispersion of hydrophilic nanoplatelets to obtain a water-dispersible barrier layer 30 e) applying a biodegradable adhesive to the inner surface of the water-dispersible barrier layer 30 f) obtaining said film 40 made from a biodegradable polymeric composition by a variety of methods including solution casing, thermal cast film extrusion and thermal blown film extrusion g) applying said film 40 made from a biodegradable polymeric composition onto the surface of the biodegradable adhesive.

In an eighth embodiment, a method of making a biodegradable paper barrier laminate comprises:

a) applying a first aqueous system of a water-borne biodegradable polymeric composition onto the inner surface of the biodegradable paper layer 10, inner surface being sized, glazed, or both sized and glazed b) removing the water from the first aqueous systems of a water-soluble biodegradable polymeric composition to obtain a first biodegradable polymeric layer 20 c) applying heat to the first biodegradable polymeric layer 20 to form a continuous layer of the first biodegradable polymeric layer 20 d) applying an aqueous dispersion of hydrophilic nanoplatelets onto the inner surface of the first biodegradable polymeric layer 20 e) removing the water from the aqueous dispersion of hydrophilic nanoplatelets to obtain a water-dispersible barrier layer 30 f) applying a biodegradable adhesive to the inner surface of the water-dispersible barrier layer 30 g) obtaining said film 40 made from a biodegradable polymeric composition that can be made by a variety of methods including solution casting, thermal cast film extrusion and thermal blown film extrusion.

h) applying said film 40 made from a biodegradable polymeric composition onto the surface of the biodegradable adhesive.

The last two methods do not require the application of a water-borne polymeric composition to form the heat seal layer 40. Instead, the heat seal layer 40 is attached to the water-dispersible barrier layer 30 via adhesive lamination of a biodegradable polymeric composition.

To make the biodegradable polymeric layers 20 or 40 from a water-borne polymeric composition that is water-soluble, an aqueous polymeric water-borne solution is typically formed by taking the water-soluble polymer as a solid form and first dissolving it into water using moderate stirring, typically 20% water-soluble polymers for 80% water by weight. The aqueous polymeric solution is then further combined with other additives such as plasticizers under moderate stirring at high temperature to form an aqueous polymeric system. The aqueous polymeric system is then coated onto a flat surface carrier (e.g. untreated PET film, stainless steel belt, fluorinated polymeric belt, or any other suitable materials) and the water removed via convective or diffusive drying process.

Without being limited to theory, it is believed that important material properties of the aqueous polymeric system where the polymer is water-soluble are: a) the solubility in water of the polymer(s) at given temperature between 20-95° C.; b) the resulting viscosity of the aqueous polymeric system at that temperature, higher viscosity being better for maximum distinction/separation between the layers; c) the wetting of the aqueous polymeric system either onto a flat carrier, or onto a water-dispersible nanoplatelets layer, or onto another biodegradable polymeric layer, higher wetting being better.

To make the water-borne biodegradable polymeric layers 20 or 40 from a water-borne polymeric composition where the polymer is water insoluble, a pre-made dispersion or emulsion of the biodegradable polymer is obtained from the manufacturer, or a dispersion or emulsion must be formed if a pre-made emulsion is not available. The aqueous polymeric system is then coated onto a flat surface carrier (e.g. untreated PET film, stainless steel belt, fluorinated polymeric belt, or any other suitable materials) and the water removed via convective or diffusive drying process. The applied heat must also be sufficient to form a continuous polymeric layer.

Without being limited to theory, it is believed that important material properties of the aqueous polymeric system where the polymer is water insoluble are: a) the ability of the biodegradable polymer to be made into an emulsion in water at given temperature between 20-95° C.; b) the resulting viscosity of the aqueous polymeric system at that temperature, higher viscosity being better for maximum distinction/separation between the layers; c) the wetting of the aqueous polymeric system either onto a flat carrier, or onto a water-dispersible nanoplatelets layer, or onto another biodegradable polymeric layer, higher wetting being better.

The drying step is typically performed by conveyor dryers, such as those commercialized by Krönert GmbH & Co KG (Hamburg, Germany) under the brand name Drytec®, by Coatema Coating Machinery GmbH (Dormagen, Germany) under the brand name ModulDry® and/or by FMP Technologies GmbH (Erlangen, Germany) under the brand name SenDry® or PureDry®. In some embodiments, the drying substrate is guided through the hot air tunnel by a running belt (belt dryers), by multiple idlers (rolling dryers) or by multiple hot air nozzles (floatation dryers). Without being limited to theory, it is believed that the most important parameters of the drying process are: The residence time of the drying substrate into the hot air tunnel, typically about 50 s for 60µ thick aqueous polymeric system where the polymer is water-soluble containing 25% solids; the temperature of the hot air, typically about 95° C.; the velocity of the hot air flowing above the substrate, typically about 25 m/s. The heating system can be electrical, thermal oil, steam or gas-fire based.

For water-borne polymeric systems where the biodegradable polymer is water insoluble, an additional heating step may be required after drying to form a continuous polymeric layer. For instance, after coating an aqueous biodegradable PHA dispersion onto substrate, and removing the water by heating the dispersion at 105° C., an additional heating at 170° C., is applied for 30 seconds to melt PHA and close the pores between the dried white PHA particles. This delivers a continuous clear PHA layer. If the PHA layer thin enough, the drying and melting steps can also be combined.

In some embodiments, it may be preferred that the polymeric system is not aqueous alone but that the aqueous polymeric system also contains alcohol in a proportion 0 to 100%, or another solvent. In that case, special dryer systems may be required to safely eliminate the alcohol or solvent.

To make a water-dispersible nanoplatelets layer 30, an aqueous nanoplatelets dispersion is typically formed by taking the water-dispersible nanoplatelets as solid form and first exfoliating them into some water using high energy ball milling, typically 80% water-dispersible nanoplatelets for 20% water by weight. The aqueous nanoplatelets dispersion is then further diluted in water under vigorous stirring at moderate temperature. The aqueous nanoplatelets dispersion is then coated onto one biodegradable polymeric layer and the water is removed via drying.

Without being limited to theory, it is believed that an important material property of the nanoplatelets are: a) the aspect ratio of the nanoplatelets (the higher aspect ratio being the better for barrier performance); b) the total exfoliation and dispersion of the nanoplatelets in water under intense shear mixing, without nanoplatelets re-agglomeration, allowing a substantially homogeneous coating of evenly distributed nanoplatelets, such that the homogeneous coating is without defects, such as pinholes or cracks. Without being limited to theory, it is also believed that the most important processability properties of aqueous nanoplatelets dispersions are: the viscosity of the aqueous nanoplatelets dispersion, higher viscosities being better for maximum distinction/separation between the layers and therefore maximum barrier performance; the wetting of the aqueous nanoplatelets dispersion either onto a water-soluble polymeric layer or onto another water-dispersible nanoplatelets layer; the shear applied on the aqueous nanoplatelets dispersion, the higher being the better for parallel nanoplatelets orientation to the barrier plane: the water removal from the dispersion via diffusive drying without generating defects in the nanoplatelets layer.

Many processes were tested for coating aqueous nanoplatelets dispersions: wire rod coating, anilox roll coating, reverse roll coating, slot die extrusion coating, roll-to-roll coating and spray coating. Aqueous extrusion coating via tailored slot die (e.g. FMP Technology, Coatema) proved the most reliable processes provided proper infeed of the aqueous nanoplatelets dispersion, whereas roll-to-roll process delivered the best barrier performance via superior shearing of the aqueous nanoplatelets dispersion, hence superior parallel orientation of the nanoplatelets, hence superior barrier performance. That barrier performance is nonetheless also dependent to the overall thickness of the water-dispersible nanoplatelets layer. Typically, the thickness of the water-dispersible nanoplatelets layer ranges from about 0.1 µm to about 20 µm to provide an adequate barrier performance whilst maintaining sufficient mechanical flexibility and mechanical resistance.

In another non-limiting embodiment of the method, the water-dispersible nanoplatelets barrier layer 30 is obtained in multiple application steps of coating and drying the aqueous nanoplatelets dispersion, each nanoplatelets sublayer masking hypothetical defects in the underlaying nanoplatelets sublayer, thus delivering maximum barrier performance. To do so, a first water-dispersible nanoplatelet barrier sublayer is formed onto the water-soluble polymeric layer 10 according to any of the above-mentioned methods; Subsequently, one or more additional water-dispersible nanoplatelets barrier sublayers may be added until the desired water-dispersible nanoplatelets layer thickness is obtained. Following this method, relatively thick water-dispersible nanoplatelets layer can be formed within the water-soluble films. Where increased optical transparency and mechanical flexibility is desired, the additional water-dispersible nanoplatelets barrier sublayers can be separated by additional thin water-soluble polymeric sublayers. The various polymeric or barrier sublayers may have substantially the same chemical composition or a different one, to deliver different properties to the overall structure. The adhesion between the sublayers is solely provided by the molecular interactions between the water-soluble polymers and the hydrophilic nanoplatelets. Similarly, the cohesion among the sublayers is solely provided by the molecular interactions among materials of identical composition or chemistry, without using binders. The absence of binders maximizes the barrier performance against water permeation and maintains the dispersibility of the nanoplatelets in water once the top/bottom polymeric layers are dissolved or dispersed.

In other embodiments, the biodegradable polymeric layer 40 is laminated against the water-dispersible barrier layer 30. In one embodiment, lamination involves curtain coating a biodegradable polymeric melt onto the water-dispersible barrier layer at about 100-250 m/min and cooling via contact with a chilled roll. The curtain is obtained by extruding the biodegradable polymeric melt through a slot die.

In another embodiment, lamination involves coating a solution-based adhesive onto an already formed biodegradable polymeric film and combining with the paper barrier laminate. Nonlimiting film making processes are thermal cast extrusion, or thermal blown extrusion or solution casting. Nonlimiting examples of adhesives include acrylic, polyvinyl acetate, and other commonly used adhesive tie layers suitable for polar materials. In such embodiments, the adhesive could be Epotal 3702® ex BASF or could be BioTAK® ex Berkshire Labels.

Inks, Branding & Decoration

The biodegradable paper barrier laminate according to the present invention may be opaque or translucent. The biodegradable paper barrier laminate according to the present invention may comprise a printed area. Printing may be achieved using standard printing techniques, such as flexographic, gravure, or inkjet printing.

The biodegradable paper barrier laminate according to the present invention may be arranged as a package in a myriad of configurations. For example, the package may comprise a plurality of panels which enclose a plurality of articles. Each of these panels comprises an inner surface and an outer surface. The outer surface and/or inner surface of one or more panels may comprise ink or dyes which create branding on the package, package information, and/or background color, etc. The branding and/or other package information associated with the product within the package is provided on the outer surface of at least one panel. Branding can include logos, trade names, trademarks, icons, and the like associated with the product within the package. Branding is utilized to inform a consumer of the product within the package. Package information can include the size of the product, the number of products within the package, an exemplary image of the products contained within the package, recyclability logos, and the like associated with the products within the package.

In all aspects of the invention, the ink that is deposited can be either solvent-based or water-based and the pigments within the ink may be either organic or inorganic, or a combination of both. In some embodiments, the ink is highly abrasion resistant. For example, the high abrasion resistant ink can include coatings cured by ultraviolet radiation (UV) or electron beams (EB). In some embodiments, any organic pigments within the ink are derived from a petroleum source. In some embodiments, any organic pigments within the ink are derived from a renewable resource, such as soy, a plant. In some embodiments, any organic pigments within the ink will be biodegradable if the pigment is organic. In other embodiments, any inorganic pigments within the ink will be made from an inorganic metal oxide that is dispersible and not harmful to the environment.

Non-limiting examples of inks include ECO-SUREI™ from Gans Ink & Supply Co, and the solvent based VUTEk® and BioVu™ inks from EFI, which are derived completely from renewable resources (e.g., corn). Others include SunVisto AquaGreen® from Sun Chemicals.

The ink is present in a thickness of about 0.5 μm to about 20 μm, preferably about 1 μm to about 10 μm, more preferably about 2.5 μm to about 3.5 μm.

The biodegradable paper barrier laminate of the present disclosure may comprise inks and/or dyes to provide a background color to the packages of the present disclosure. To further clarify the background color, it is worth noting that the paper layer comprises a base color. A base color of the paper layer is the color of the package without inks or dyes. For example, bleached paper is white in color, unbleached is brown in color, grass-derived paper is green in color and paper which includes recycled content is grey in color. A background color is any color that is not a base color, e.g. blue, red, green, yellow, purple, orange, black, or combinations thereof. However, background color can also include white, brown, or grey, if the color is achieved via inks and/or dyes.

In order to reduce the use of inks/dyes for the benefit of the recycling process, the natural colour of the paper layer may be utilized. For example, inks/dyes may be used to define the background colour of the consumer-facing panel only, whereas the natural colour of the paper layer would be used as background colour for the other panels of the flexible package.

Surface Coating

In some embodiments, the printed surface of the biodegradable paper barrier laminate is surface coated to protect the ink layer from its physical and chemical environment, to increase the durability of the paper layer and to provide a glossy or matte finish. This optional surface coating may be called a lacquer or a varnish or a splash-resistant layer. In some embodiments, the surface coating is made a nitrocellulose lacquer, an acrylic lacquer, a water-based lacquer, a reactive two-components polyurethane lacquer. In some preferred embodiments, the surface coating is made from natural waxes passing the OECD301B biodegradation screening test, such as bees wax, rapeseed wax, candelilla wax, soy wax, or another natural wax, provided that the temperature of exposure is not exceeding the wax melting point. Because the thickness of the surface coating affects the recyclability and the biodegradation of the package made from the recyclable paper barrier laminate of the present invention, thinner surface coating is preferred. The thickness of the surface coating is preferably between 0.1 μm to 25 μm, more preferably below 10 μm, even more preferably below 5 μm.

Method of Making a Biodegradable Paper Based Package

The biodegradable paper barrier laminate described herein can be formed into articles, including but not limited to those in which typical film or sealable paper would be used as a packaging material. Such articles include, but are not limited to pouches, sachets, bags, flow-wraps, pillow bags and other containers. Pouches, sachets, bags, flow-wraps, pillows and other such containers that incorporate the biodegradable paper barrier laminate described herein can be made in any suitable manner known in the art.

The biodegradable paper barrier laminates made according to the present invention can be converted into the packages and articles using a form-fill-seal process (FFS). A traditional FFS process typically involves three successive steps where the package or article is formed from the paper laminate, filled, and then sealed or closed, as described in U.S. Pat. No. 6,293,402, which is incorporated herein for reference. In heat sealing methods, a temperature range exists above which the seal would be burnt, and below which the seal would not be sufficiently strong. Seals are provided by any sealing means known to one skilled in the art. Sealing can comprise the application of a continuously heated element to the paper laminate, and then removing the element after sealing. The heating element can be a hot bar that includes jaws or heated wheels that rotate. Different seal types include fin seals and overlap seals.

Single-Lane Process

A well-known sealing single lane process using a vertical form and fill machine is described in U.S. Pat. No. 4,521,437, incorporated herein by reference. In this process, a flat web of material is unwound from a roll and formed into a continuous tube by sealing the longitudinal edges on the film together to form a lap seal (i.e. fin seal). The resulting tube is pulled vertically downwards to a filling station, and collapsed across a transverse cross-section of the tube, the position of such cross-section being at a sealing device below the filling station. A transverse heat seal is made by the sealing device at the collapsed portion of the tube, thus making an air-tight seal across the tube. After making the transverse seal, a pre-set volume of material to be packaged, e.g. flowable material, enters the tube at the filling station, and fills the tube upwardly from the aforementioned transverse seal. The tube is then dropped a predetermined distance under the influence of the weight of the material in the tube, and of the film advance mechanism on the machine. The jaws of the sealing device are closed, collapsing the tube at a second transverse section, which is above the air/material interface in the tube. The sealing device seals and severs the tube transversely at said second transverse section. The material-filled portion of the tube is now in the form of a pillow shaped sachet. Thus, the sealing device has sealed the top of the filled sachet, sealed the bottom of the next-to-be-formed sachet, and separated the filled sachet from the next-to-be-formed sachet, all in one operation.

Multi-Lane Process

The packages of the invention can also be processed using a multi-lane sachet packaging machine, such as the VEGA PACK300S by QuadroPack (Nijeveen, Netherlands). A high-speed, multi-lane sachet processing machine is also described in U.S. Pat. No. 6,966,166, incorporated herein for reference. The machine used in this process includes two rolls for dispensing sheets of webbed film of equal dimensions, a plurality of sealing devices appropriate for such a substrate and means, such as the pump station described below for inserting contents (e.g. liquid, viscous materials, powders & other substances) into the film packages. A plurality of packages can be produced by utilizing one or more moveable reciprocating carriages that travel with the flow of film through the machine, the carriages supporting each of the sealing and cross-cutting stations. The sealing devices are applied to all but one of the edges, forming a pouch with a cavity and an opening. The desired contents of the package are inserted into the cavity through the opening. The opening is then sealed and separated from the substrate. A pair of substrate rolls is provided at the substrate roll station. Alternatively, a cutter can be placed at a middle of a single nip roller to divide the substrate width into two equal parts. Sheets of paper laminates are advanced through the apparatus by the pull-wheel station and used to form the front and back panels of the package. The paper laminate from each roll is guided so that the two sheets of paper laminate are in close proximity to, and in a parallel relationship with, one another when they are advanced through the machine. The sealing and cutting devices include: longitudinal sealing bars to seal the package's vertical sides, a unidirectional roller to hold the paper laminate in position and prevent it from sliding backward, a vertical cutter to cut a tear-off slit into the package in the vertical direction, and cross-sealing bars to seal the packages in horizontal direction. The pump station comprises of a plurality of fill dispensers in communication with a storage structure containing the consumer product into the package. These dispensers are capable of drawing a pre-determined quantity of consumer product from a reservoir and depositing it into the cavities of the paper laminate packages formed by the machine. In the preferred embodiment, the pump station and dispensers may be driven by one or more motion-controlled servomotors in communication with the cam system. The quantity of consumer product may be changed by exchanging the dispensers (with different dispensers having more or less capacity), changing the stroke of the pump cycle, changing the timing of the pump cycle, and the like. Therefore, different quantities of consumer products can be dispensed, depending upon the size and capacity of the packages to be formed by the machine.

The sealing mechanism can be thermal heat sealing, water sealing, moisture sealing, ultrasonic sealing, infrared sealing, or any other type of sealing deemed suitable.

Articles of Manufacture

Figure 7:
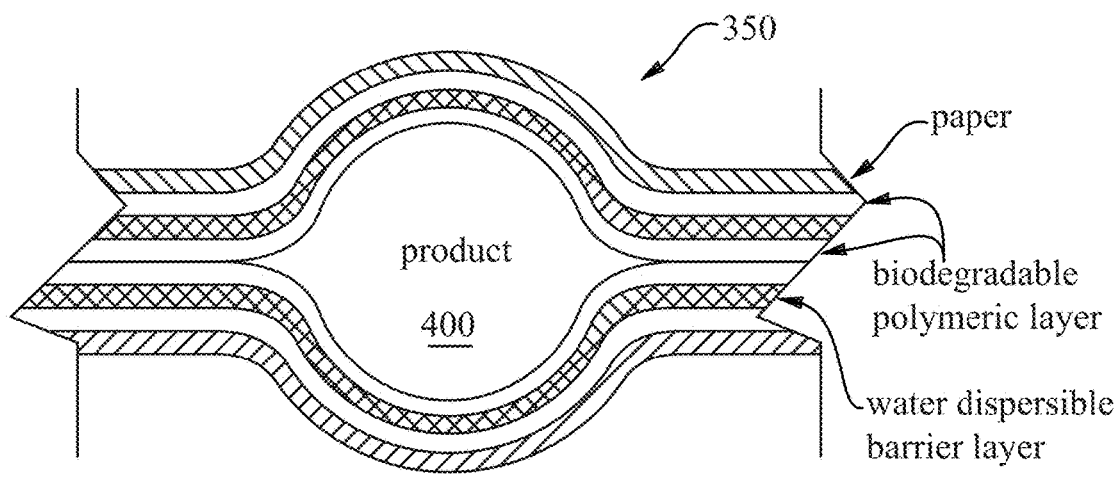
FIG. 7 shows a schematic representation of an application of a biodegradable paper barrier laminate.

As shown in FIG. 7, the present invention also includes articles comprising a product composition 400 and a biodegradable paper barrier laminate 150 which may be formed into a container 350, such as a pouch, a sachet, a capsule, a bag, etc, to hold the product composition. For simplicity, the articles of interest herein will be described in terms of biodegradable barrier paper pouches, although it should be understood that discussion herein also applies to other types of containers.

The pouches 350 formed by the foregoing methods, can be of any form and shape which is suitable to hold the composition 400 contained therein, until it is desired to release the composition 400 from the biodegradable paper barrier laminate pouch 350, such as by ripping it open. The pouches 350) may comprise one compartment, or two or more compartments (that is, the pouches can be multi-compartment pouches). In one embodiment, the biodegradable paper barrier laminate pouch 350 may have two or more compartments.

In one embodiment, the biodegradable paper barrier laminate may be sealed to a water-soluble barrier film that does not have paper attached. This enables a window into the package to be formed so that the consumer can see the product, without modifying the recyclability of the package.

The pouches or other containers 350 may contain a unit dose of one or more compositions 400 from a range of products that could include (but not limited to) contain a consumer product. As used herein, "consumer product" refers to materials that are used for hair care, beauty care, oral care, health care, personal cleansing, and household cleansing, for example. Nonlimiting examples of consumer products include shampoo, conditioner, mousse, face soap, hand soap, body soap, liquid soap, bar soap, moisturizer, skin lotion, shave lotion, toothpaste, mouthwash, hair gel, hand sanitizer, laundry detergent compositions dishwashing detergent, automatic dishwashing machine detergent compositions, hard surface cleaners, stain removers, fabric enhancers and/or fabric softeners, cosmetics, and over-the-counter medication, electronics, pharmaceuticals, confectionary, pet healthcare products, *cannabis* derived products, hemp derived products, CBD based products, other products derived from drugs other than *cannabis*, vitamins, non-pharmaceutical natural/herbal "wellness" products, razors, absorbent articles, wipes, hair gels, food and beverage, animal food products, menstrual cups, exfoliating pads, electrical and electronic consumer devices, brushes, applicators, ear plugs, eye masks, eye patches, face masks, agricultural products, plant food, plant seeds, insecticides, ant killers, alcoholic beverages, animal food products and new product forms. Typical absorbent articles of the present invention include but are not limited to diapers, adult incontinence briefs, training pants, diaper holders, menstrual pads, incontinence pads, liners, absorbent inserts, pantiliners, tampons, period pants, sponges, tissues, paper towels, wipes, flannels and the like.

The biodegradable barrier paper laminate of the present disclosure may be used as the primary package material for absorbent articles. The term "absorbent article" as used herein refers to devices which absorb and contain exudates, and, more specifically, refers to devices which are placed against or in proximity to the body of the wearer to absorb and contain the various exudates discharged from the body. Absorbent articles of the present disclosure include, but are not limited to, diapers, adult incontinence briefs, training pants, diaper holders, menstrual pads, feminine hygiene pads, incontinence pads, liners, absorbent inserts, pantiliners, tampons, and the like.

Plastic films have historically been used as the primary package (the package on store shelves) material for absorbent articles, but the recyclable barrier paper laminate of the present disclosure may be used instead. The present inventive material meets the need for natural based packaging materials which are flexible and resilient. The recyclable barrier paper laminate of the present invention meets the need for natural based packaging materials which can withstand the rigors of an absorbent article packaging process. Furthermore, it meets the need for natural based packaging materials which exhibits barrier properties and can be readily recycled by consumers. Even furthermore, the recyclable barrier paper laminate of the present disclosure meets the need for natural based, barrier packaging materials which are viewed by consumers as non-plastic and technically validated to be non-plastic.

The composition 400 inside the pouches 350 can be in any suitable form including, but not limited to: powders, solid foams, fibers, solids, granules, liquids, gels, pastes, creams, capsules, pills, dragees, solid foams, fibers, absorbent articles, nonwovens, etc. The pouches are particularly suitable for dry products, in addition to some pastes, gels, liquids products that contain less than 30% water, more preferably less than 20% water. The packages and articles of the present invention are resistant to the consumer product. As used herein, "resistant" refers to the ability of the packages and articles to maintain their mechanical properties and artwork on their surfaces, as designed, without degradation of the package and article via diffusion of the consumer product through the package material.

Additional product forms (articles) include, disposable aprons, laundry bags, disposable hospital bedding, skin patches, face masks, disposable gloves, disposable hospital gowns, medical equipment, skin wraps, agricultural mulch films, shopping bags, fefill pouch, reloadable component into a durable system, sandwich bags, trash bags, emergency blankets and clothing, building/construction wrap & moisture resistant liners, primary packaging for shipping, such as envelopes and mailers, non-absorbent clothing articles that can be used to encase clothing items, for example dresses, shirts, suits, and shoes.

The different compartments of multi-compartment pouches 350 may be used to separate incompatible ingredients. For example, it may be desirable to separate dry shampoo and dry conditioner, or laundry powder and laundry additives into separate compartments.

Due to improvements in water vapor and oxygen barrier, the dyes and perfumes typically used in some products should have greater stability inside pouches made from biodegradable paper barrier laminate compared to pouches made from paper laminate without barrier. Also, it is likely that the barrier against migration of grease, surfactants and other chemistries contained within the packaging will be improved compared to packages made from paper laminate without barrier.

At the end of life of the package, the package may be recycled by the consumer in conventional paper recycling systems. The structure will break up in the re-pulping system, enabling the paper fibers to be recovered. The soluble polymer will dissolve and be filtered away and will eventually biodegrade, or it can be recovered from the wastewater of the recycling plant to be re-used again. Any barrier materials are inert, harmless and occur naturally and will safely disperse in the wastewater. However, if littered, the packages will biodegrade within 6-12 months.

In order to facilitate, as well as to encourage the recyclability of the package, the package made from the structure of the present disclosure may comprise less than 50 percent by weight of inks, dyes, barrier layers, polymeric layers, glues and/or synthetic fibers. The weight percentage of inks, inks, dyes, barrier layers, polymeric layers, glues and/or synthetic fibers, in the package can be less than 50 percent by weight, more preferably less than 30 percent by weight, or most preferably less than 10 percent by weight, specifically reciting all values within these ranges and any ranges created thereby. For example, the weight percentage of inks, dyes, barrier layers, polymeric layers, glues and/or synthetic fibers, in the package material can be between 0.1 percent by weight to 50 percent by weight, more preferably between 0.1 percent by weight to 30 percent by weight, or most preferably between 0.1 percent by weight to 10 percent by weight, specifically reciting all values within these ranges and any ranges created thereby. In one specific example, the amount of inks, dyes, barrier layers, polymeric layers, glues and/or synthetic fibers, is 5 percent by weight or less or between 0.1 percent by weight to 5 percent by weight, specifically reciting all values within these ranges and any ranges created thereby.

It is preferred that the resulting overall package made from the paper barrier laminate described in the present disclosure comprises at least 50 percent by weight of natural cellulose fibers, at least 70 percent by weight natural cellulose fibers, or at least 80 percent by weight natural cellulose fibers, specifically reciting all values within these ranges and any ranges created thereby.

The recyclability of the package according to the present invention may be determined via recyclable percentage. The paper barrier laminate according to the present invention may exhibit recyclable percentages of 50 percent or greater, more preferably 70 percent or greater, or most preferably 80 percent or greater, specifically reciting all values within these ranges and any ranges created thereby. The paper barrier laminate according to the present invention may have a recyclable percentage yield of between 50 percent to about 99 percent, more preferably from about 85 percent to about 99 percent, or most preferably from about 90 percent to about 99 percent.

Test Methods

When testing and/or measuring a material, if the relevant test method does not specify a particular temperature, then the test and/or measure is performed on specimens at 23° C. (±3° C.), with such specimens preconditioned at that temperature. When testing and/or measuring a material, if the relevant test method does not specify a particular humidity, then the test and/or measure is performed on specimens at 35% (±5%), with such specimens preconditioned at that humidity. Testing and/or measuring should be conducted by trained, skilled, and experienced personnel, according to good laboratory practices, via properly calibrated equipment and/or instruments.

1) Thickness of Individual Layers/Overall Laminate

The thickness of the overall film/individual layers is measured by cutting a 20 μm thick cross-section of a film sample via sliding microtome (e.g. Leica SM2010 R), placing it under an optical microscope in light transmission mode (e.g. Leica Diaplan), and applying an imaging analysis software. Water-dispersible nanoplatelets layers contrast strongly with water-soluble polymeric layers. In case of adjacent water-soluble polymeric layers, the contrast can be achieved by adding different tracers such as 0.5% rhodamine B or 0.5% titan dioxide nanoparticles by weight.

2) Water Vapour Transmission Rate (WVTR)

This test method is performed according to ASTM F1249-13 under the following test conditions: The temperature is 40° C. (±0.56° C.) and the relative humidity is 50% (±3%). If tropical conditions are required, the temperature is set to 38° C. (±0.56° C.) and the relative humidity to 90% (±3%). The water vapour transmission rate is reported in g/m²/day. If normalized by the barrier thickness, the water vapour transmission rate is reported in g·μm/m²/day. For materials outside of the Scope (§ 1.1) of ASTM F-1249-13, the water vapour transmission rate test method does not apply.

3) Biodegradation Test

Aerobic biodegradation is measured by the production of carbon dioxide ($CO_2$) from the sample specimen according to the test method 301B and the test guidelines 306 of the Section 3 of the OECD Guidelines for the Testing of Chemicals. OECD 301B applies to the major components (paper, barrier, sealant) and the final package. The final package includes all major and minor (inks, varnishes) components and is open to mimic its disposal after consumption. OECD 306 applies to the final package tested in marine water. Pass/fail success criteria are shown below:

| Test Method | Pass Criteria |
|---|---|
| OECD 301B (1992) | |
| Test major components in each layer | 60% th$CO_2$ evolution or |
| Test fully formed sachet* | 60% th$O_2$ consumption in 60 days |
| OECD 306 (1992) | 60% th$CO_2$ evolution or |
| Test fully formed sachet* | 60% th$O_2$ consumption in 60 days |

*Fully formed sachet indicates the final form of the sachet (containing all dyes and coatings) that will be disposed of in the environment. This sachet would be cut open to mimic being ripped open by a consumer.

The sample should biodegrade at least 60% within 60 days, preferably at least 60% within 28 days.

EXAMPLE

1. Biodegradable Paper Barrier Laminate Based on Paper, Polyvinyl Alcohol and Sodium Cloisite®
Preparation of Aqueous Sealing Layer Composition 1070 g of demineralized water was heated up in a Thermomix TM5 to 50° C. 400 g of solid PVOH powder (Selvol™205 ex Sekisui Chemicals, Tokyo, Japan) was added under stirring at level 2.5-3.0 and temperature was set to 85° C. When the temperature of 85° C., was reached, (in about 5 min), the stirring level was reduced to 1.0-1.5 to avoid extreme foaming. After 30 min of constant stirring at 85° C., the polymer was dissolved. In parallel, 50 g sorbitol and 50 g glycerol were mixed with 100 g demineralized water at 85° C. Then, both polymer and plasticizer solutions were mixed at 85° C., under stirring level 1.0-1.5 for about 5 min. The solution was stored over night at room temperature to eliminate any residual foam.
Preparation of Aqueous Barrier Layer Composition 1120 g of demineralized water was heated up in a Thermomix® TM5 to 50° C. 100 g of master-batch paste (CNaMGH ex MBN Nanomaterialia consisting of 80% Na–Cloisite® ex BYK exfoliated in 20% water) was added under stirring at level 3.0. Cloisite® is a natural bentonite, aspect ratio is about 200, whereas the natural $Ca^{2+}$ was substituted by Nat to enable its exfoliation in polar media. Once completed, the stirring level was increased to 5.0 and the residual paste agglomerates were scrapped off the mixing container wall/mixer blades. After 30 min of constant stirring at level 5.0 the nanoparticles were homogeneously dispersed forming a brownish viscous liquid/gel, leaving some gel at the wall of the container which must be removed using a flexible scraper.
Preparation of Aqueous Lamination Layer Composition 650 g of demineralized water is heated up in a Thermomix® TM5 to 50° C. 400 g of solid PVOH powder (Selvol™ 205 ex Sekisui Chemicals) is added under stirring at level 2.5-3.0 and temperature is set to 85° C. When the temperature of 85° C., is reached, (in about 5 min), the stirring level is reduced to 1.0-1.5 to avoid extreme foaming. After 30 min of constant stirring at 85° C., the polymer is dissolved. In parallel, 100 g glycerol is mixed with 100 g demineralized water at 85° C. Then, both polymer and plasticizer solutions are mixed together at 85° C., under stirring level 1.0-1.5 for about 5 min. The solution is stored over night at room temperature to eliminate any residual foam.

Making of Biodegradable Paper Barrier Laminate Based on Paper, Polyvinyl Alcohol and Sodium Cloisite®

In one non-limiting embodiment (Sample 1), a first water-soluble polymeric sealing layer was formed by extrusion coating 100μ aqueous sealing layer composition at 85° C., onto an untreated PET carrier film (Hostaphan® RN 50-350 ex Mitsubishi, Tokyo, Japan) via slot die from FMP Technology and the water removed via convective drier from FMP Technology set at 95° C. The composition of the resulting 34μ dry layer was 80% Selvol™ 205 ex Sekisui Chemicals, 10% glycerol and 10% sorbitol. As next step, a water-dispersible nanoplatelets barrier layer was added by extrusion coating 60μ aqueous barrier layer composition at 50° C., onto the first single water-soluble polymeric sealing layer via slot die from FMP Technology and the water removed via convective drier from FMP Technology set at 95° C. The composition of the resulting 4μ dry layer was 100% sodium Cloisite® ex BYK. Finally, the multilayer structure was laminated against the inner sized side of a recyclable 99μ thick paper grade traded as NiklaSelect® V Natural Linen from Birgl & Bergmeister GmbH (B&B), Styria, Austria, coated with 12μ aqueous lamination layer composition at [on]Line Laminating & Technology Center (Neuss). The water from the solution was absorbed into the paper. The composition of the resulting 5μ dry layer was 80% Selvol™ 205 from Sekisui Chemicals and 20% glycerol from Cremer.

In another non-limiting embodiment (Sample 2), a first water-soluble polymeric sealing layer was formed by extrusion coating 100μ aqueous sealing layer composition at 85° C., onto an untreated PET carrier film (Hostaphan® RN 50-350 ex Mitsubishi) via slot die from FMP Technology and the water removed via convective drier from FMP Technology set at 95° C. The composition of the resulting 34μ dry layer was 80% Selvol™ 205 ex Sekisui Chemicals, 10% glycerol and 10% sorbitol. As next step, a first water-dispersible nanoplatelets barrier sublayer was added by extrusion coating 60μ aqueous barrier layer composition at 50° C., onto the first single water-soluble polymeric sealing layer via slot die from FMP Technology and the water removed via convective drier from FMP Technology set at 95° C. The composition of the resulting 4μ dry layer was 100% sodium Cloisite® ex BYK. A second water-dispersible nanoplatelets barrier sublayer was then added by extrusion coating 60μ aqueous barrier layer composition at 50° C., onto the first water-dispersible nanoplatelets barrier sublayer via slot die from FMP Technology and the water removed via convective drier from FMP Technology set at 95° C. The composition of the resulting 1μ dry layer was 100% sodium Cloisite® ex BYK. Finally, the multilayer structure was laminated against the inner sized side of a recyclable 99μ thick paper grade traded as NiklaSelect® V Natural Linen from Birgl & Bergmeister (B&B) coated with 12μ aqueous lamination layer composition at [on]Line Laminating & Technology Center (Neuss). The water from the solution was absorbed into the paper. The composition of the resulting 5μ dry layer was 80% Selvol™ 205 from Sekisui Chemicals and 20% glycerol from Cremer.

In another non-limiting embodiment (Sample 3), a first water-soluble polymeric sealing layer was formed by extrusion coating 100μ aqueous sealing layer composition at 85° C., onto an untreated PET carrier film (Hostaphan® RN 50-350 ex Mitsubishi) via slot die from FMP Technology and the water removed via convective drier from FMP Technology set at 95° C. The composition of the resulting 34μ dry layer was 80% Selvol™ 205 ex Sekisui Chemicals, 10% glycerol and 10% sorbitol. As next step, a first water-dispersible nanoplatelets barrier sublayer was added by roll-to-roll coating 14μ aqueous barrier layer composition at room temperature onto the first single water-soluble polymeric sealing layer at [on]Line Laminating & Technology Center (Neuss) and the water absorbed into the first water-soluble polymeric layer. The composition of the resulting 1μ dry layer was 100% sodium Cloisite® ex BYK. A second water-dispersible nanoplatelets barrier sublayer was then added by roll-to-roll coating 14μ aqueous Cloisite® dispersion at room temperature onto the first water-dispersible nanoplatelets barrier sublayer at [on]Line Laminating & Technology Center (Neuss) and the water removed by evaporation over an entire week. The composition of the resulting 0.5μ dry layer was 100% sodium Cloisite® ex BYK. Finally, the multilayer structure was laminated against the inner sized side of a recyclable 99μ thick paper grade traded as NiklaSelect® V Natural Linen from Birgl & Bergmeister (B&B) coated with 12μ aqueous lamination layer composition at [on]Line Laminating & Technology Center (Neuss). The water from the solution was absorbed into the paper. The composition of the resulting 5μ dry lamination layer was 80% Selvol™ 205 from Sekisui Chemicals and 20% glycerol from Cremer.

Table 3 below provides the barrier performance (WVTR) of the above-mentioned embodiments.

2. Biodegradable Paper Barrier Laminate Based on Paper, PVOH, Sodium Cloisite® and PBSA Preparation of an Aqueous Lamination Layer Composition 650 g of demineralized water was heated up in a Thermomix TM5 to 50° C. 400 g of solid PVOH powder (Selvol™ 205 ex Sekisui Chemicals) was added under stirring at level 2.5-3.0 and temperature was set to 85° C. When the temperature of 85° C., was reached, (in about 5 min), the stirring level was reduced to 1.0-1.5 to avoid extreme foaming. After 30 min of constant stirring at 85° C., the polymer was dissolved. In parallel, 100 g glycerol was mixed with 100 g demineralized water at 85° C. Then, both polymer and plasticizer solutions were mixed at 85° C., under stirring level 1.0-1.5 for about 5 min. The solution was stored over night at room temperature to eliminate any residual foam.

Preparation of an Aqueous Barrier Layer Composition 1120 g of demineralized water was heated up in a Thermomix TM5 to 50° C. 100 g of master-batch paste

TABLE 3

| | | Layers | | | | | WVTR at (40° C., 50% r.H.) | |
|---|---|---|---|---|---|---|---|---|
| Sample | Barrier Process | PVOH μm | Cloisite® μm | Cloisite® μm | PVOH μm | Paper μm | Average g/m²/day | Std Dev g/m²/day |
| Sample 1 | Extrusion Coating | 34 | 4 | — | 5 | 99 | 13.0 | 0.6 |
| Sample 2 | Extrusion Coating | 34 | 4 | 1 | 5 | 99 | 7.3 | 0.5 |
| Sample 3 | Roll-to-Roll Coating | 34 | 1 | 0.5 | 5 | 99 | 5.0 | 0.2 |

Although the barrier performance from a water-dispersible nanoplatelets single layer (Sample 1) is suitable for many recyclable paper-based flexible packages applications, the barrier performance can be significantly increased by splitting the water-dispersible nanoplatelets single layer in two sublayers (Sample 2). Without being bound to theory, it is believed that the second sublayer masks any possible defects present in the first sublayer.

Although the barrier performance from a water-dispersible nanoplatelets double sublayers applied via extrusion coating (Sample 2) is suitable for many recyclable paper-based flexible packages applications, the barrier performance can be significantly increased by applying the water-dispersible nanoplatelets double sublayers via roll-to-roll coating (Sample 3). Without being bound to theory, it is believed that the increased shear of the roll-to-roll coating process orients the Cloisite® nanoplatelets in the plane of the barrier layer better, hence increasing the permeation length in the barrier layer and therefore increasing the barrier performance.

Table 4 provides the biodegradability and recyclability of the above-mentioned embodiments.

(CNaMGH ex MBN Nanomaterialia consisting of 80% Na-Cloisite® ex BYK exfoliated in 20% water) was added under stirring at level 3.0. Cloisite® is a natural bentonite, aspect ratio is about 200, whereas the natural $Ca^{2+}$ was substituted by $Na^+$ to enable its exfoliation in polar media. Once completed, the stirring level was increased to 5.0 and the residual paste agglomerates were scrapped off the mixing container wall/mixer blades. After 30 min of constant stirring at level 5.0 the nanoparticles were homogeneously dispersed forming a brownish viscous liquid/gel, leaving some gel at the wall of the container which must be removed using a flexible scraper.

Preparation of PBSA for Extrusion Coating

PBSA pellets grade FD92PM were sourced from Mitsubishi Chemicals and used as such.

Preparation of a PBSA Free-Standing Film

PBSA pellets grade FD92PM were obtained from Mitsubishi Chemicals. The pellets were melted in an extruder and then formed into a film using common cast or blown film extrusion techniques.

TABLE 4

| | Layers | | | | | PTS Recyclability | | Biodegradability |
|---|---|---|---|---|---|---|---|---|
| Test Code | PVOH μm | Cloisite® μm | Cloisite® μm | PVOH μm | Paper μm | Recyclable % | Visual Test | OECD 301B |
| Sample 1 | 34 | 4 | — | 5 | 99 | 99 | Passed | Passed |
| Sample 2 | 34 | 4 | 1 | 5 | 99 | 99 | Passed | tbd |
| Sample 3 | 34 | 1 | 0.5 | 5 | 99 | 99 | Passed | tbd |

Preparation of an Adhesive Composition

An adhesive grade Epotal 3702 was sourced from BASF for the purpose of adhesive lamination.

Making of Biodegradable Paper Barrier Laminate Based on Paper, PVOH, Sodium Cloisite® and PBSA In one non-limiting embodiment, the inner sized side of a biodegradable 99μ thick paper grade traded as NiklaSelect® V Natural Linen from Birgl & Bergmeister (B&B) is coated with 12μ aqueous lamination layer composition. The water from the solution is absorbed into the paper and the remaining water was removed via convective drier from FMP Technology set at 95° C. The composition of the resulting 5μ dry layer was 80% Selvol™ 205 from Sekisui Chemicals and 20% glycerol from Cremer. As next step, a water-dispersible nanoplatelets barrier layer was added by extrusion coating 60μ aqueous barrier layer composition at 50° C., onto the first single water-soluble polymeric sealing layer via slot die from FMP Technology and the water removed via convective drier from FMP Technology set at 95° C. The composition of the resulting 4μ dry layer was 100% sodium Cloisite® ex BYK. As a next step, a polymeric sealing layer is added by curtain coating a biodegradable polymeric melt onto the water-dispersible barrier layer at about 100-250 m/min and by cooling via contact with a chilled roll. The curtain is formed by extruding the biodegradable polymeric melt through a slot die.

In another non-limiting embodiment, the inner sized side of a biodegradable 99μ thick paper grade traded as NiklaSelect® V Natural Linen from Birgl & Bergmeister (B&B) is coated with 12μ aqueous lamination layer composition. The water from the solution is absorbed into the paper and the remaining water was removed via convective drier from FMP Technology set at 95° C. The composition of the resulting 5μ dry layer was 80% Selvol™ 205 from Sekisui Chemicals and 20% glycerol from Cremer. As next step, a water-dispersible nanoplatelets barrier layer was added by extrusion coating 60μ aqueous barrier layer composition at 50° C., onto the first single water-soluble polymeric sealing layer via slot die from FMP Technology and the water removed via convective drier from FMP Technology set at 95° C. The composition of the resulting 4μ dry layer was 100% sodium Cloisite® ex BYK. As a next step, a solution-based adhesive composition Epotal 3702 from BASF is coated onto the water-dispersible barrier layer and the solvent is removed via convective drier from FMP Technology set at 95° C., to form an adhesive layer. As next step, the PBSA film is combined onto the adhesive layer to deliver a heat sealable biodegradable barrier paper laminate.

COMPARATIVE EXAMPLE

A. Non-Biodegradable Paper Barrier Laminate Based on Polyvinyl Alcohol and Polyvinyl Dichloride Preparation of Aqueous Sealing Layer Composition 1070 g of demineralized water is heated up in a Thermomix TM5 to 50° C. 400 g of solid PVOH powder (Selvol™ 205 ex Sekisui Chemicals) is added under stirring at level 2.5-3.0 and temperature is set to 85° C. When the temperature of 85° C., is reached, (in about 5 min), the stirring level is reduced to 1.0-1.5 to avoid extreme foaming. After 30 min of constant stirring at 85° C., the polymer is dissolved. In parallel, 50 g sorbitol and 50 g glycerol are mixed with 100 g demineralized water at 85° C. Then, both polymer and plasticizer solutions are mixed together at 85° C., under stirring level 1.0-1.5 for about 5 min. The solution is stored over night at room temperature to eliminate any residual foam.

Preparation of Non-Aqueous Barrier Layer Composition 1000 g of methyl-ethyl-ketone (MEK) and ethyl-acetate (EA) solvent mixture (60:40) is heated up in a glass beaker to 50° C., inside a protective fume hood. 200 g of polyvinyl dichloride (PVDC) powder grade Resin F310 ex Asahi Kasei is added under magnetic stirring. Once completed, the stirring level is increased to the maximum level and the heating is switched off. After about 2 hours of constant stirring at maximum level, the PVDC powder is completely dissolved. The solution is stored over night at room temperature (RT) to eliminate any residual foam.

Preparation of Aqueous Lamination Layer Composition 650 g of demineralized water is heated up in a Thermomix TM5 to 50° C. 400 g of solid PVOH powder (Selvol™ 205 ex Sekisui Chemicals) is added under stirring at level 2.5-3.0 and temperature is set to 85° C. When the temperature of 85° C., is reached, (in about 5 min), the stirring level is reduced to 1.0-1.5 to avoid extreme foaming. After 30 min of constant stirring at 85° C., the polymer is dissolved. In parallel, 100 g glycerol is mixed with 100 g demineralized water at 85° C. Then, both polymer and plasticizer solutions are mixed together at 85° C., under stirring level 1.0-1.5 for about 5 min. The solution is stored over night at room temperature to eliminate any residual foam.

Making of Paper Barrier Laminate Based on Polyvinyl Alcohol and Polyvinyl Dichloride In one non-limiting embodiment, a first water-soluble polymeric sealing layer is formed by extrusion coating 100μ aqueous sealing layer composition at 85° C., onto an untreated PET carrier film (Hostaphan® RN 50-350 ex Mitsubishi) via slot die from FMP Technology and the water removed via convective drier from FMP Technology set at 95° C. The composition of the resulting 34μ dry layer is 80% Selvol™ 205 ex Sekisui Chemicals, 10% glycerol and 10% sorbitol. As next step, a first non-dispersible barrier sublayer is added by coating 30μ non-aqueous barrier layer composition at 50° C., onto the first single water-soluble polymeric sealing layer via anilox roll and the MEK/EA solvent removed via convective drier from Drytec set at 95° C. The composition of the resulting 3μ dry layer was 100% PVDC grade F310 ex Asahi Kasei. A second non-dispersible barrier sublayer is then added by coating 30μ non-aqueous barrier layer composition at 50° C., onto the first single water-soluble polymeric sealing layer via anilox roll and the MEK/EA solvent removed via convective drier from Drytec set at 95° C. The composition of the resulting 3μ dry layer is 100% PVDC grade F310 ex Asahi Kasei. Finally, the multilayer structure is laminated against the inner (less) sized side of a recyclable 65μ thick paper grade traded as PackPro® 7.0 from Birgl & Bergmeister (B&B) coated with 12μ aqueous lamination layer composition at [on]Line Laminating & Technology Center (Neuss). The water from the solution is absorbed into the paper. The composition of the resulting 5μ dry layer is 80% Selvol™ 205 ex Sekisui Chemicals and 20% glycerol from Cremer.

Although such a PVdC sample (which has been commonly used in the packaging industry over the last 20 years) would have a moisture barrier similar as that of the clay barrier at 40 C/50% RH, the PVdC barrier would not harmlessly disperse in nature if the package was trashed because PVdC is made of non-biodegradable plastic and so it could form microplastics once the package starts to disintegrate in the environment. In addition, it would not be expected to disperse as easily in the hot water of a paper re-pulping plant or if it ended up as trash in the environment. In fact may companies have banned the use of PVdC—despite its excellent barrier properties due to potential chlorine emissions during the production process and if burnt at end of life. The clay barrier would be considered a more environmentally friendly barrier than a PVdC barrier.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A biodegradable paper barrier laminate comprising:
   a) a biodegradable paper layer having an outer surface and an inner surface;
   b) a first biodegradable polymeric layer, having a thickness from about 1 μm to about 5 μm and having an outer surface and an inner surface, said outer surface disposed on said inner surface of said paper layer;
   c) a water-dispersible barrier layer comprising 96 wt. % to 100 wt. % hydrophilic nanoplatelets comprising sodium cloisite, having an outer surface and an inner surface, said outer surface disposed on said inner surface of said first biodegradable polymeric layer;
   d) a second biodegradable polymeric layer having an outer surface and an inner surface, said outer surface disposed on said inner surface of said water-dispersible barrier layer;
      wherein each layer and the entire biodegradable paper barrier laminate achieves at least 60% biodegradation within 60 days in the OECD 301B test.

2. The biodegradable paper barrier laminate of claim 1, wherein the grammage of the biodegradable paper barrier laminate is from about 20 to about 1,000 g/m$^2$.

3. The biodegradable paper barrier laminate of claim 1, wherein the WVTR of the biodegradable paper barrier laminate is from about 0.1 g/m$^2$/day to about 100 g/m$^2$/day when measured at 40° C., temperature and 50% relative humidity according to the ASTM method F1249-13.

4. The biodegradable paper barrier laminate of claim 1, wherein the WVTR of the biodegradable paper barrier laminate is from about 0.1 g/m$^2$/day to about 200 g/m$^2$/day when measured at 38° C., temperature and 90% relative humidity according to the ASTM method F1249-13.

5. The biodegradable paper barrier laminate of claim 1, wherein the WVTR of the biodegradable paper barrier laminate is from about 0.1 g/m$^2$/day to about 200 g/m$^2$/day when measured at 40° C., temperature and 50% relative humidity according to the ASTM method F1249-13.

6. The biodegradable paper barrier laminate of claim 1, wherein the WVTR of the biodegradable paper barrier laminate is from about 0.1 g/m$^2$/day to about 200 g/m$^2$/day when measured at 40° C., temperature and 50% relative humidity according to the ASTM test method F1249-13.

7. The biodegradable paper barrier laminate of claim 1, wherein the biodegradable paper barrier laminate is recyclable and exhibits a recyclable percentage of at least 50 percent, as determined by the test method PTS-RH:021/97 (Draft October 2019).

8. The biodegradable paper barrier laminate of claim 1, wherein the biodegradable paper barrier laminate is recyclable and exhibits an overall "pass" result, as determined by the test method PTS-RH:021/97 (Draft October 2019).

9. The biodegradable paper barrier laminate of claim 1, wherein the biodegradable paper layer comprises between about 50 percent and about 100 percent, by weight, of natural fibers.

10. The biodegradable paper barrier laminate of claim 1, wherein the biodegradable paper is made of natural fibers comprising at least one of cellulose-based fibers, bamboo fibers, cotton, abaca, kenaf, sabai grass, flax, esparto grass, straw, jute, hemp, bagasse, milkweed floss fibers, pineapple leaf fibers, wood fibers, pulp fibers, or combinations thereof.

11. The biodegradable paper barrier laminate of claim 1, wherein the biodegradable paper is made of natural fibers comprising wood fibers or pulp fibers.

12. The biodegradable paper barrier laminate of claim 1, wherein the biodegradable paper is made of recycled natural fibers as determined by visual inspection.

13. The biodegradable paper barrier laminate of claim 1, wherein the biodegradable paper is sized and/or machine-glazed on at least one surface, or is glassine, or is vellum paper.

14. The biodegradable paper barrier laminate of claim 1, wherein the biodegradable paper is made via foam-forming process, a paper-making process replacing water by water-based foam.

15. The biodegradable paper barrier laminate of claim 1, wherein the average thickness of the second biodegradable polymeric layer is from about 1 μm to about 200 μm.

16. The biodegradable paper barrier laminate of claim 1, wherein at least one of the first or the second biodegradable polymeric layers comprises different biodegradable polymers.

17. The biodegradable paper barrier laminate of claim 1, wherein at least one of the first or the second biodegradable polymeric layers comprise more than one biodegradable polymeric sublayer.

18. The biodegradable paper barrier laminate of claim 1, wherein the biodegradable polymeric layers comprise at least one water insoluble polymer that is at least one of polyhydroxyalkanoate, polybutylene succinate, polybutylene succinate co-adipate, polybutylene adipate-co-terephthalate, polylactic acid, or thermoplastic starch.

19. The biodegradable paper barrier laminate of claim 1, wherein the biodegradable polymeric layers comprise a water-soluble polymer that is at least one of polyvinyl alcohol, polyethylene oxide, methylcellulose, or sodium alginate.

20. The biodegradable polymeric layers of claim 19, wherein the water-soluble polyvinyl alcohol is either homopolymer or copolymer, either partially or fully hydrolyzed.

21. The biodegradable polymeric layers of claim 19, wherein the water-soluble polyvinyl alcohol has an average molecular weight from about 20,000 Da to about 150,000 Da.

22. The biodegradable polymeric layers of claim 19, wherein the water-soluble polyvinyl alcohol is a homopolymer with a degree of hydrolyzation from about 70% to about 100%.

23. The biodegradable polymeric layers of claim 19, wherein the water-soluble polyethylene oxide has an average molecular weight from about 50,000 Da to about 400,000 Da.

24. The biodegradable polymeric layers of claim 19, wherein the water-soluble methylcellulose has an average molecular weight from about 10,000 Da to about 100,000 Da.

25. The biodegradable polymeric layers of claim 19, wherein the water-soluble methylcellulose is methoxyl substituted from about 18% to about 32% and hydroxypropoxyl substituted from about 4% to about 12%.

26. The biodegradable polymeric layers of claim 19, wherein the water-soluble sodium alginate has an average molecular weight from about 10,000 Da to about 240,000 Da.

27. The biodegradable polymeric layers of claim 1, wherein the biodegradable polymeric layers comprise at least one plasticizer.

28. The biodegradable polymeric layers of claim 27, wherein the plasticizer is at least one of water, glycerol, sorbitol, propylene glycol (PG), trimethylene glycol (PDO), trimethylolpropane (TMP), methylpropanediol (MPD), 2-methyl-1,3 propanediol (MPO), or mixtures thereof.

29. The biodegradable paper barrier laminate of claim 1, wherein the water-dispersible barrier layer is distinct from the biodegradable polymeric layers observed via optical microscopy or scanning electron microscopy.

30. The biodegradable paper barrier laminate of claim 1, wherein the average thickness of the water-dispersible barrier layer is from about 0.1 µm to about 20 µm.

31. The biodegradable paper barrier laminate of claim 1, wherein the water-dispersible barrier layer comprises more than one water-dispersible barrier sublayer.

32. The water-dispersible barrier layer of claim 1, wherein the average aspect ratio of the hydrophilic nanoplatelets is greater than about 100.

33. The water-dispersible barrier layer of claim 1, wherein the average aspect ratio of the hydrophilic nanoplatelets is from about 100 to about 20,000.

34. The biodegradable paper barrier laminate according to claim 1, of which is included in a package material for one or more absorbent articles.

35. A biodegradable paper barrier laminate comprising:
  a) a biodegradable paper layer having an outer surface and an inner surface;
  b) a first biodegradable polymeric layer, having a thickness from about 1 µm to about 5 µm and having an outer surface and an inner surface, said outer surface disposed on said inner surface of said paper layer;
  c) a water-dispersible barrier layer comprising 96 wt. % to 100 wt. % hydrophilic nanoplatelets comprising sodium cloisite, having an outer surface and an inner surface, said outer surface disposed on said inner surface of said biodegradable polymeric layer;
  d) a biodegradable adhesive layer having an outer surface and an inner surface, said outer surface disposed on said inner surface of said water-dispersible barrier;
  e) a second biodegradable polymeric layer having an outer surface and an inner surface, said outer surface disposed on said inner surface of said biodegradable adhesive layer; wherein each layer and the entire biodegradable paper barrier laminate achieves at least 60% biodegradation within 60 days in the OECD 301B test.

36. Method of making the biodegradable paper barrier laminate of claim 1 comprising:
  a) applying a first aqueous system of a water-borne biodegradable polymeric composition onto a surface of a removeable flat carrier;
  b) removing the water from the first aqueous system of a water-borne biodegradable polymeric composition to obtain a first biodegradable polymeric layer;
  c) applying an aqueous dispersion of hydrophilic nanoplatelets onto the outer surface of the first biodegradable polymeric layer;
  d) removing the water from the aqueous dispersion of hydrophilic nanoplatelets to obtain a water-dispersible barrier layer;
  e) applying a second aqueous system of a water-borne biodegradable polymeric composition onto the inner surface of a biodegradable paper layer;
  f) combining the outer surface of the water-dispersible barrier layer onto the second aqueous system of a water-borne biodegradable polymeric composition;
  g) removing the water from the second aqueous system of a water-borne biodegradable polymeric composition to obtain a second biodegradable polymeric layer;
  h) removing the flat carrier from the resulting biodegradable paper barrier laminate.

37. Method of making the biodegradable paper barrier laminate of claim 1 comprising:
  a) applying a first aqueous system of a water-borne biodegradable polymeric composition onto a surface of a removeable flat carrier;
  b) removing the water from the first aqueous system of a water-borne biodegradable polymeric composition to obtain a first biodegradable polymeric layer;
  c) applying heat to the first biodegradable polymeric layer to form a continuous first biodegradable polymeric layer;
  d) applying an aqueous dispersion of hydrophilic nanoplatelets onto the outer surface of the first biodegradable polymeric layer;
  e) removing the water from the aqueous dispersion of hydrophilic nanoplatelets to obtain a water-dispersible barrier layer;
  f) applying a second aqueous system of a water-borne polymeric composition onto the inner surface of a biodegradable paper layer;
  g) combining the outer surface of the water-dispersible barrier layer onto the second aqueous system of a water-borne polymeric composition;
  h) removing the water from the second aqueous system of a water-borne biodegradable polymeric composition to obtain a second biodegradable polymeric layer;
  i) removing the flat carrier from the resulting biodegradable paper barrier laminate.

38. Method of making the biodegradable paper barrier laminate of claim 1 comprising:
  a) applying a first aqueous system of a water-borne biodegradable polymeric composition onto the inner surface of a biodegradable paper layer;
  b) removing the water from the first aqueous system of a water-borne polymeric composition to obtain a first biodegradable polymeric layer;

c) applying an aqueous dispersion of hydrophilic nanoplatelets onto the inner surface of the first biodegradable polymeric layer;
d) removing the water from the aqueous dispersion of hydrophilic nanoplatelets to obtain a water-dispersible barrier layer;
e) applying a second aqueous system of a water-borne biodegradable polymeric composition onto the inner surface of the water-dispersible barrier layer;
f) removing the water from the second aqueous system of a water-borne biodegradable polymeric composition to obtain a second biodegradable polymeric layer.

39. Method of making the biodegradable paper barrier laminate of claim 1 comprising:
a) applying a first aqueous system of a water-borne biodegradable polymeric composition onto the inner surface of the biodegradable paper layer;
b) removing the water from the first aqueous system of a water-borne polymeric composition to obtain a first biodegradable polymeric layer;
c) applying an aqueous dispersion of hydrophilic nanoplatelets onto the inner surface of the first biodegradable polymeric layer;
d) removing the water from the aqueous dispersion of hydrophilic nanoplatelets to obtain a water-dispersible barrier layer;
e) applying a second aqueous system of a water-borne biodegradable polymeric composition onto the inner surface of the water-dispersible barrier layer;
f) removing the water from the second aqueous system of a water-borne biodegradable polymeric composition to obtain a second biodegradable polymeric layer;
g) applying heat to the second biodegradable polymeric layer to form a continuous second biodegradable polymeric layer.

40. Method of making the biodegradable paper barrier laminate of claim 1 comprising:
a) applying a first aqueous system of a water-borne biodegradable polymeric composition onto the inner surface of a biodegradable paper layer;
b) removing the water from the first aqueous systems of a water-borne biodegradable polymeric composition to obtain a first biodegradable polymeric layer;
c) applying an aqueous dispersion of hydrophilic nanoplatelets onto the inner surface of the first biodegradable polymeric layer;
d) removing the water from the aqueous dispersion of hydrophilic nanoplatelets to obtain a water-dispersible barrier layer;
e) melting a second biodegradable polymeric composition within an extruder;
f) thermally extruding the molten second biodegradable polymeric composition onto the surface of the water-dispersible barrier layer;
g) cooling the molten second biodegradable polymeric composition to form the second biodegradable polymeric layer.

41. Method of making the biodegradable paper barrier laminate of claim 35 comprising:
a) applying a first aqueous system of a water-borne biodegradable polymeric composition onto the inner surface of the biodegradable paper layer;
b) removing the water from the first aqueous systems of a water-borne biodegradable polymeric composition to obtain a first biodegradable polymeric layer;
c) applying an aqueous dispersion of hydrophilic nanoplatelets onto the inner surface of the first biodegradable polymeric layer;
d) removing the water from the aqueous dispersion of hydrophilic nanoplatelets to obtain a water-dispersible barrier layer;
e) applying a biodegradable adhesive to the inner surface of the water-dispersible barrier layer;
f) obtaining a second biodegradable polymeric layer;
g) applying the second biodegradable polymeric layer onto the inner surface of the biodegradable adhesive.

42. The method according to claim 36, wherein water transferred from the applied aqueous nanoplatelets dispersion onto the water-borne biodegradable polymeric layer is below the dispersion point of the water-borne biodegradable polymeric layer in water.

43. The method according to claim 36, wherein water transferred from the applied aqueous polymeric system onto the water-dispersible nanoplatelets layer is below the dispersion point of the water-dispersible nanoplatelets layer in water.

44. The method according to claim 36, wherein the first and/or second aqueous systems are applied via a coating process.

45. The method according to claim 36, wherein the aqueous dispersion of hydrophilic nanoplatelets is applied via a coating process.

* * * * *